(12) United States Patent
Bachenheimer et al.

(10) Patent No.: US 9,582,802 B2
(45) Date of Patent: *Feb. 28, 2017

(54) IDENTITY THEFT AND FRAUD PROTECTION SYSTEM AND METHOD

(71) Applicant: Kemesa, Inc., Sandy, UT (US)

(72) Inventors: Steven I. Bachenheimer, Aventura, FL (US); Keith Dowding, Sandy, UT (US); Chris Skipworth, Sandy, UT (US)

(73) Assignee: KEMESA, INC., Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,402

(22) Filed: Apr. 7, 2014

(65) Prior Publication Data

US 2014/0304157 A1    Oct. 9, 2014

Related U.S. Application Data

(63) Continuation-in-part of application No. 12/083,147, filed on Apr. 3, 2008, now Pat. No. 8,719,106, which
(Continued)

(51) Int. Cl.
*G07F 7/08* (2006.01)
*G06Q 20/40* (2012.01)
(Continued)

(52) U.S. Cl.
CPC ..... *G06Q 20/4016* (2013.01); *G06F 21/6254* (2013.01); *G06F 21/6263* (2013.01);
(Continued)

(58) Field of Classification Search
CPC .... G06Q 20/383; G06Q 20/02; G06Q 50/265; G06F 21/6254; H04L 2463/102; H04L 9/3234
See application file for complete search history.

(56) References Cited

U.S. PATENT DOCUMENTS

| 7,689,007 B2 * | 3/2010 | Bous | G06Q 20/383 382/115 |
| 8,676,709 B2 * | 3/2014 | Kunz | G06Q 20/105 705/35 |

(Continued)

*Primary Examiner* — Oluseye Iwarere
*Assistant Examiner* — Talia Crawley
(74) *Attorney, Agent, or Firm* — Robert M. Downey, P.A.

(57) ABSTRACT

A system and method protects users against theft of personally identifiable information during both online and offline purchase transactions, registration transactions and identity authentication transactions. The system initially obtains a user's personally identifiable information as storable computer data, establishes an anonymous email address on behalf of the subscribing user, provides the anonymous email address to an email recipient when the subscribing user sends an email to the recipient, receives email communications from the recipient at the anonymous email address, stores the routing information from the email communications, scrubs the email communications for electronic viruses, forwards the email communications received from the recipient at the anonymous email address to the subscribing user, and forwards email communications to the recipient that are sent from the subscribing user to the anonymous email address by matching the stored routing information without ever revealing the subscribing user's real email address to the recipient.

7 Claims, 10 Drawing Sheets

Related U.S. Application Data is a continuation-in-part of application No. 11/245,502, filed on Oct. 7, 2005, now Pat. No. 8,396,747.

(51) Int. Cl.
*G06Q 10/10* (2012.01)
*G06F 21/62* (2013.01)
*H04L 29/06* (2006.01)
*H04L 12/58* (2006.01)

(52) U.S. Cl.
CPC ........... *G06Q 10/107* (2013.01); *H04L 51/12* (2013.01); *H04L 63/0407* (2013.01); *H04L 12/585* (2013.01); *H04L 63/0428* (2013.01); *H04L 63/145* (2013.01); *H04L 63/18* (2013.01)

(56) References Cited

U.S. PATENT DOCUMENTS

| | | | | |
|---|---|---|---|---|
| 2001/0044785 | A1* | 11/2001 | Stolfo | G06F 21/6254 705/74 |
| 2003/0187787 | A1* | 10/2003 | Freund | G06Q 20/10 705/39 |
| 2004/0179682 | A1* | 9/2004 | Soliman | H04L 9/0822 380/44 |
| 2004/0254893 | A1* | 12/2004 | Tsuei | G06Q 10/08 705/74 |
| 2006/0045270 | A1* | 3/2006 | Cohen | G06F 21/6218 380/268 |
| 2007/0078786 | A1* | 4/2007 | Bous | G06Q 20/383 705/74 |

\* cited by examiner

IDENTITY THEFT AND FRAUD PROTECTION SYSTEM AND METHOD

CROSS-REFERENCE TO RELATED APPLICATIONS

This application is a continuation-in-part of co-pending patent application Ser. No. 12/083,147 filed on Apr. 3, 2008, which is a continuation-in-part of patent application Ser. No. 11/245,502 filed on Oct. 7, 2005 (now U.S. Pat. No. 8,396, 747).

BACKGROUND OF THE INVENTION

Field of the Invention

The present invention relates to identity theft protection and, more particularly, to a system and method for protection against theft of personally identifiable information (PII) when conducting both online and offline purchase transactions and other non-purchase operations, such as registration and identity authentication procedures.

Discussion of the Related Art

Identity theft is one of the fastest growing crimes in the world, and is becoming increasingly sophisticated and difficult to prevent. In the United States alone, the Federal Trade Commission (FTC) reports that victim complaints have increased exponentially from the year 2000 to present. In many instances, identity thieves obtain personally identifiable information of a large number of individuals by stealing data from one or more databases. The personal information compromised often includes data elements such as Social Security numbers, account numbers, telephone numbers, addresses and driver's license numbers of millions of victims.

The Justice Department's Bureau of Justice Statistics estimates that 16.6 million people in the United States experienced at least one incident of identity theft in 2012. The financial losses attributed to identity theft totals $24.7 billion. In 2012, the most common type of identity theft included the misuse or attempted misuse of an existing account, such as a credit card account or bank account. Approximately 7.7 million reports of fraudulent use of a credit card and 7.5 million reports of fraudulent misuse of a bank account were made in 2012.

For people whose identities have been stolen, it can take months, and sometimes years, and thousands of dollars to correct the damage. Until the problem is resolved, victims of identity theft may lose job opportunities, be refused loans, and even get arrested for crimes they didn't commit. Additionally, criminals may open new credit card accounts in the victims' names and then run up charges that they will never pay. The victims' personally identifiable information may also be used to establish telephone or wireless service in the victims' names. Identity thieves have also been known to open bank accounts in victims' names and write bad checks on those accounts. In other instances, criminals may counterfeit checks, credit cards or debit cards, or authorize electronic bank transfers that drain the funds from a bank account.

Theft of personally identifiable information from computers and online (e.g. the Internet) environments is particularly problematic and widespread. The two primary means of misappropriating personally identifiable information in an online environment are database theft/hacking and phishing. Database hacking typically involves theft of identity information of a large number of victims from a centralized storage source, such as a merchant or credit card transaction processor database. Phishing scams involve fraudulent requests for information from consumers, usually via email messages, and are now the most rapidly expanding method of identity theft. Phishing scammers typically forge the "from" field of an email message so that it appears to be from a reputable company, such as a well-known merchant or bank. The message urges the recipient to click on a link in the email message in order to update account information under the premise that the company suspects that the email recipient's account has been tampered with. The link leads to a website that looks credible and requests the unsuspecting recipient to type in his/her personal information, which may include their Social Security number, bank account number and credit and debit card numbers.

As mentioned above, personally identifiable information of a large number of individuals is often obtained by stealing/hacking data from one or more databases. In virtually all cases, such thefts have occurred from encrypted and unencrypted databases. In many instances, theft of identity information from a central data storage location is a result of an "inside job" by an employee who may have authorized access to the database. In some instances, the employee may be lured into this criminal activity with payoffs from those who ultimately use the stolen identity information for their own monetary gain. In other cases, the criminal-minded employee may be a plant, having sought out the most opportunistic employment position for the primary purpose of gaining access to one or more databases containing valuable identity information of a large number of potential victims. Accordingly, the storage of personally identifiable information of a large number of individuals at a central data storage location is risky and renders such identity information vulnerable to theft by both "insiders" and outside hackers.

In other instances, sophisticated criminals steal a person's credit or debit card numbers by capturing the information in a data storage device in a practice known as "skimming". Identity theft can also occur when making offline purchases, particularly when a credit card is used. A thief may swipe a victim's card to capture the number and other account information, or attach a capturing device to an ATM machine where the victim inserts his/her bank card. To protect consumers, credit card companies offer various products that attempt to stop thieves from stealing credit card account information. However, these various protection products do not enable a card user to make purchases with complete anonymity. Thus, transactions remain traceable to account information, and there is always a danger of theft of the user's personally identifiable information. The key to our technology is it protects the data itself, not the access to data.

The alarming concern surrounding the rapidly growing problem of personal identity theft and credit card fraud has led to numerous proposed systems and methods aimed at preventing or reducing risk of theft or misuse of personal and financial information.

For example, U.S. Pat. No. 6,839,692 B2 to Carrott et al. discloses a method and apparatus for providing secure credit facility transactions for purchasing goods and services over a computer network, such as the Internet. The method and apparatus disclosed in Carrott et al. stores a user's privileged information and other transactional data on the user's own computer. The method includes encryption of all information before or during its storage on the user's hard drive. The method and system includes the ability for the user to complete electronic commerce transactions without revealing certain elements of the encrypted information, such as credit card numbers, to the merchant. Further, the method and system creates and controls sub-accounts on a single credit card facility, such as a credit card account, and controls sub-account spending amounts and replenishment periods. However, unlike the present invention, as described more fully hereinafter, the method and system in Carrott et al. fails to provide maximum user anonymity throughout purchase transactions. When making an online purchase using the system and method in Carrott et al., the user must still provide his/her actual street address, email address and phone number. Further, the Carrott et al. system is not universally accessible in any respect. For instance, the system and method in Carrott et al. does not provide for access to all credit card accounts of a user or other forms of payment (e.g. bank accounts via direct debit or ACH, e-currency, electronic funds transfer, etc.) and may not allow for use at all merchant websites. Accordingly, the system and method in Carrott et al. is very limited in scope (i.e. not universal) and fails to fully protect theft of the user's personally identifiable information.

In U.S. Pat. No. 6,636,833 B1 and U.S. Patent Application Pub. No. US 2003/0028481 A1, both to Flitcroft et al., a credit card system and method is disclosed for providing limited use credit card numbers and/or cards to be used for a single- or limited-use transaction. The system can be used for both "card remote" transactions, such as by telephone or Internet, or for "card present" transactions. Methods for limiting, distributing and using a limited use card number, controlling the validity of a limited use credit card number, conducting a limited use credit card number transaction and providing remote access devices for accessing a limited use credit card number are also provided. However, unlike the present invention, as described more fully hereinafter, the Flitcroft et al. credit card system and method fails to provide for maximum universality and user anonymity. For instance, the Flitcroft et al. system is limited to credit card payment. Flitcroft et al. fails to provide universal payment options to the user, such as direct debit from a designated bank account, payment from any bank account via Automated Clearing House (ACH), e-currency, electronic funds transfer or any other legal form of payment in a purchase transaction. Furthermore, a user of the Flitcroft et al. credit card system is required to provide their real name and address to a merchant when making an online purchase. Also, for "card present" transactions, the Flitcroft et al. credit card system reveals a name and number on the card, and a signature may be required by the user when making a "card present" transaction. Additionally, the credit card system in Flitcroft et al. requires the user to enter the limited-use credit card numbers when conducting an online transaction. Moreover, the Flitcroft et al. credit card system may require the user to reveal his/her actual email address to online merchants.

U.S. Patent Application Pub. No. US 2002/0116341 A1 to Hogan et al. discloses a method and system for conducting secure payments over a computer network which uses a pseudo-expiration date in the expiration date field of an authorization request. Unlike the present invention, as described more fully hereinafter, the method and system in Hogan et al. fails to provide for universality and maximum user anonymity. More particularly, the user of the method and system in Hogan et al. has limitations of use and method of payment (i.e. credit card payment only) and must provide their name, address, email address and credit card number when making a purchase or payment over a computer network, such as the Internet.

The U.S. patent to Demoff et al., U.S. Pat. No. 6,456,984 B1, discloses a method and system for providing temporary credit authorizations in a consumer transaction which eliminates the need for a traditional credit card. According to Demoff et al., the system responds to a request for issuing a credit transaction number that is made concurrent with a particular transaction. The credit transaction number is then randomly generated and made valid only for the requested transaction, and automatically ages a short period of time after the request. The credit transaction numbers are continually recycled for subsequent requests irrespective of the customer identity. The request can be made from a mobile communication device or from a personal computer using an electronic commerce program. Transactions between customers and registered or known online merchants can be automatically carried out by a centralized service provider without generating the unique, temporary number, or without the need for the customer or merchant to exchange personal information. Unlike the system and method of the present invention, as described more fully hereinafter, the system disclosed in U.S. Pat. No. 6,456,984 B1 to Demoff et al. requires online merchants to first register with the system and be pre-approved for secure transactions. Thus, the method and system of Demoff et al. limits user access to only online merchants that have been pre-approved and registered with the system. Moreover, the system and method of Demoff et al. does not provide for universal access to any form of payment, including all credit cards, bank accounts (via ACH or direct debit), e-currency, electronic funds transfer, cash, or any other legal form of payment selected by the user. Further, the system and method in Demoff et al. fails to provide for maximum user anonymity throughout the purchase transaction.

The current financial marketplace offers a broad array of credit card and debit card products for both general and limited use. Despite attempts to provide for added security against fraud and identity theft, all of these products, when used for "card present" transactions, have significant limitations, particularly with protection of user identity. For instance, almost all credit cards and debit cards display a user name on the card. Also, a card number directly associated with the user's account is visible on the card, along with an expiration date. In most instances, a user of a credit card will be required to sign his/her name when conducting a "card present" transaction. Additionally, since all credit card products do not require PIN entry at the point of transaction, they are easily used for fraudulent purposes if stolen.

The present invention provides the following advantages over virtually all credit-card type products for use in conducting both "card-not-present" and "card present" transactions:

Universal access at virtually any location using any electronic device (e.g. PC, Apple, cell phone, PDA, land line phone), with any computer platform (operating system), on any Internet browser and at any website, web store and physical store.

Universal forms of payment from virtually any financial source of the Member/user Use of any financial institution of the Member's choice No name, card numbers or expiration date visible on card Member signature is not required (provided electronically)

Of no value if stolen without PIN entry

Limited exposure by allowing the user to control the value of the card to an amount less than the full credit line The current financial industry also offers an array of products for both "card present" and "card-not-present" transactions. These products fall into a number of different major categories including:

Wallets or E currency (PAY PAL, YAHOO)—this is a system of prearranged charge "centers" that debit purchases against designated credit cards or financial accounts Conventional Credit Cards (VISA, MASTERCARD, DISCOVER and AMERICAN EXPRESS)—cards with assigned account numbers that access the full credit lines of the established credit card accounts Debit Cards—usually require entry of a PIN at place of transaction and are directly tied to a bank account or other financial accounts (not a credit card account) that are automatically debited after the purchase transaction. Theft or unauthorized use exposes the entire balance in the linked bank account to possible theft.

Association-Based Controlled Use Credit Cards (VERIFIED by VISA, MASTERCARD SECURECODE)—employ controlled use credit cards with use being generally limited to participating merchants Card Issuer-Based Controlled Use Credit Cards (CITIBANK, MBNA)—similar to the above association-based controlled use credit cards, but usually not restricted to participating merchants The following table summarizes the considerable advantages of the system and method of the present invention versus these above-identified products:

OBJECTS AND ADVANTAGES OF THE INVENTION

Considering the foregoing, it is a primary object of the present invention to eliminate the theft of a user's personally identifiable information by providing maximum anonymity throughout the purchasing, authentication, and user registration processes (i.e., protects the data itself).

It is a further object of the present invention to provide universality in a system and method for preventing theft of a user's personally identifiable information as a result of a registration or purchase transaction, either online or offline, wherein the system and method allow the user/Purchaser to use any of a variety of electronic devices, computer platforms, Internet browsers, forms of payments, and financial institution(s), at any Merchant location (including any website), and from any user location (e.g. work, home, travel).

It is yet a further object of the present invention to provide a system and method for preventing theft of a user's personally identifiable information, and wherein no useable aspect of the user's personally identifiable information is stored at any Merchant's or third party data storage location, thereby precluding the theft of usable personally identifiable information by or from the Merchant or any third party.

| Description of Benefit | Present Invention | Wallet e-currency | Credit Card | Debit Card | Association Controlled Use Credit Card | Issuer Controlled Use Credit Card |
|---|---|---|---|---|---|---|
| Name not revealed | P | | | | | |
| Real Credit Card #s not requested during online purchase | A | A | | | | Citi Only P |
| Real Credit Card #s or other usable account # not revealed to Merchant | A | | | | A | A |
| Billing information not revealed | A | A | | | | |
| Street address not revealed | A | | | | | |
| Shipping address not revealed | P | | | | | |
| Email address not revealed | P | | | | | |
| Phone number not revealed | P | | | | | |
| Virtual Passwords | A | | | | | |
| Usable both online (via Internet) and offline (retail/physical locations) | P | | P | P | | |
| Usable with any computer platform | A | | | | | |
| Usable from a variety of electronic devices | A | | | | | |
| Usable with any browser | A | | | | | |
| Usable from any user location (home, work, travel, friend and family electronic devices) | A | | | | | |
| Usable through bank account without risk of account exposure | A | | | | | |
| Usable at any Merchant's physical location | P A (smart phone app) | | A | P | | |
| Personal Identity Info not stored at Merchant central data locations | A | | | | | |
| Access to all credit cards Member wishes to use | A | A | | | | |
| Usable at any Merchant website | A | | A | P | | |
| Automatic Merchant form fill of anonymous personally indentifiable information | A | | | | | |
| One-step access from Member desktop | A | | A | A | Discover Only (P) | |
| No major extra steps by Member during purchase | A | | A | A | A (smart phone app) | |

A = Benefit always provided
P = Benefit partially or sometimes provided based on the need of the user It is still a further object of the present invention to provide a system and method for preventing theft of a Purchaser's personally identifiable information which does not require the Purchaser to communicate any differently with a selected Merchant.

It is still a further object of the present invention to provide a system and method for preventing theft of a user's personally identifiable information and which provides proprietary and impenetrably encrypted storage of its Member's personally identifiable information.

It is still a further object of the present invention to provide a system and method for preventing theft of a Purchaser's personally identifiable information which requires no change in habits or practices of the Purchaser, Merchant or Financial Institutions. This includes not requiring any changes to Merchant checkout or transaction processing practices of Merchants or Financial Institutions in order to accept and process a transaction when using the system of the present invention.

It is still a further object of the present invention to provide a system and method for preventing theft of a Purchaser's personally identifiable information during an online (e.g. Internet) purchase transaction, and wherein the procedure is not meaningfully changed from the Purchaser's perspective and, further, wherein the Purchaser's responses to Merchant order placement and checkout screens appear identical in kind to those of any new customer from the Merchant's perspective, thereby facilitating maximum purchase anonymity.

It is still a further object of the present invention to provide a system and method for preventing theft of a Purchaser's personally identifiable information as a result of an offline purchase transaction, and wherein the Purchaser is provided with an anonymous offline purchasing account and a limited-use card associated with that account, and further wherein the card is adapted to be read by conventional credit card reading devices of Merchants without revealing the Purchaser's name, account number, expiration date or any other personally identifiable information not absolutely necessary to complete the transaction, thereby providing maximum anonymity throughout the transaction.

It is yet a further object of the present invention to provide a system and method for preventing theft of a Purchaser's personally identifiable information, wherein the user is not required to enter his/her actual credit card information online in order to obtain a controlled use card.

It is still a further object of the present invention to provide a system and method for preventing theft of a Purchaser's personally identifiable information during an online purchase transaction, and wherein the user is able to obtain a controlled use card directly from the system without having to visit other websites in order to complete the process of obtaining the controlled use card.

It is still a further object of the present invention to provide a system and method for preventing theft of a user's personally identifiable information during an online registration or purchase transaction, and wherein the system provides virtual passwords which change automatically with each transaction and/or Merchant even though the user always enters the same known password chosen by the user at the time of registration.

It is still a further object of the present invention to provide a system and method for preventing theft of a Purchaser's personally identifiable information by providing maximum anonymity throughout the purchase transaction, and wherein the Purchaser can select the level of anonymity for any purchase transactions and establish multiple profiles of varying degrees of anonymity for use with different Merchants and further wherein the Purchaser's true identity information is always obtainable by the system for security purposes, such as for Homeland Security concerns.

It is still a further object of the present invention to provide a system and method for preventing theft of a Purchaser's personally identifiable information while also protecting the system from fraudulent use of its services by incorporating a non-repudiation feature in the form of a digital (i.e. electronic) signature used to authenticate identity, thereby providing undeniable evidence that a transaction occurred and identifying the person who conducted the transaction.

BRIEF SUMMARY OF THE INVENTION

The present invention is directed to a system and method for preventing theft of a user's personally identifiable information as a result of a registration procedure or purchase transaction, either online or offline. As used throughout the specification and claims which follow, the term "online", when used to describe a type of transaction or registration, means "card-not-present" or "not physically at the Merchant location". Moreover, the term "offline", as used throughout the specification and claims to describe or classify a type of transaction, means "card present" or "physically at the Merchant location or secure location with the trusted credential".

The user first subscribes to become a Member user of the ID protection system and registers by providing relevant personally identifiable information and either accessing the system held in the secure cloud, or downloading a software application for installation on the Member's computer, at which time the Member receives a user name and a password. During the registration process, the subscribing Member provides any one or more financial sources (e.g. credit card accounts, debit card accounts, bank accounts, e-currency accounts) that will be used to fund subsequent purchase transactions. These funding sources can be updated and changed by the Member at any time in the future. Once recorded by the ID protection system, the Member's personally identifiable information is highly guarded by the system and never stored in a database that is accessible to others, such as a Merchant or processor's central data storage location. In a preferred embodiment, all Member's personally identifiable information is encrypted using the best available encryption techniques, such as, for example, strong encryption. At present, AES256 encryption is a suitable strong encryption technique. Once encrypted, the Member's personally identifiable information is stored at multiple secure storage locations that are only accessible by the system. In the case of physical locations, each such secure location will be at a geographically separate data center. In one embodiment, the personally identifiable information may be fragmented, before or after encryption, and stored at multiple data storage locations. In another embodiment, the personally identifiable information of Members is encrypted in multiple layers prior to storage. When needed by the ID protection system, the Member's personally identifiable information is retrieved from the multiple storage locations for a limited time and then the information is again encrypted for secure storage. The Member can then elect to make secure purchases or complete third party registration forms using the system. In all cases, online and offline, the Member's real identity information (i.e. name, phone numbers, email address, physical address, passwords, credit card account information, bank account information, or any other personal financial information) is not revealed to the Merchant or other third party.

The present invention protects against identity theft by generating anonymous data elements that replace the user's real personal data when interacting with a merchant or website, therefore rendering it useless if stolen from that database. This is useful in protecting against a criminal using a stolen credit or debit card, as well as in protecting against a criminal using stolen personal information to conduct various malicious activities through impersonating the real user. To reach that objective the current invention allows the user to replace personal information such as name, address, phone number and email when registering at a merchant or website even if a purchase transaction is not made or contemplated.

For example, a newspaper website may or may not charge for viewing content, yet the user must still register to take advantage of certain features of the website, and the current invention allows the user to register using anonymous data even if the site does not charge for use. In another example, a user may wish to register at a social networking website focused on antique collecting or bird-watching, and the current invention allows the user to register and use these sites without disclosing real personal information that could be valuable to a criminal for either impersonating the real user or in assisting the criminal to locate and/or use the real user's financial accounts. This use enhances the anti-phishing protection afforded by the invention by extending the number of websites covered because the email addresses and names provided are clearly identifiable to the user.

Moreover, the present invention allows the operator of an online website to authenticate the identity of a user by accepting all or some anonymous data elements generated by the invention and routing them in the exact same way as in a purchase transaction thus providing a trusted credential. Taken together, this anonymous data forms a virtual persona for the user that is generated by, and can only be approved by, the invention. The invention generates one time use card number and billing information for a purchase transaction, and this same billing data is used to authenticate the card to the user just as is done in a normal credit card transaction. The unique ability of the invention to dynamically generate all this data on demand and then approve it for a website operator almost instantaneously prevents criminal activity because the data did not exist prior to use, and so could not have been stolen or re-engineered.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
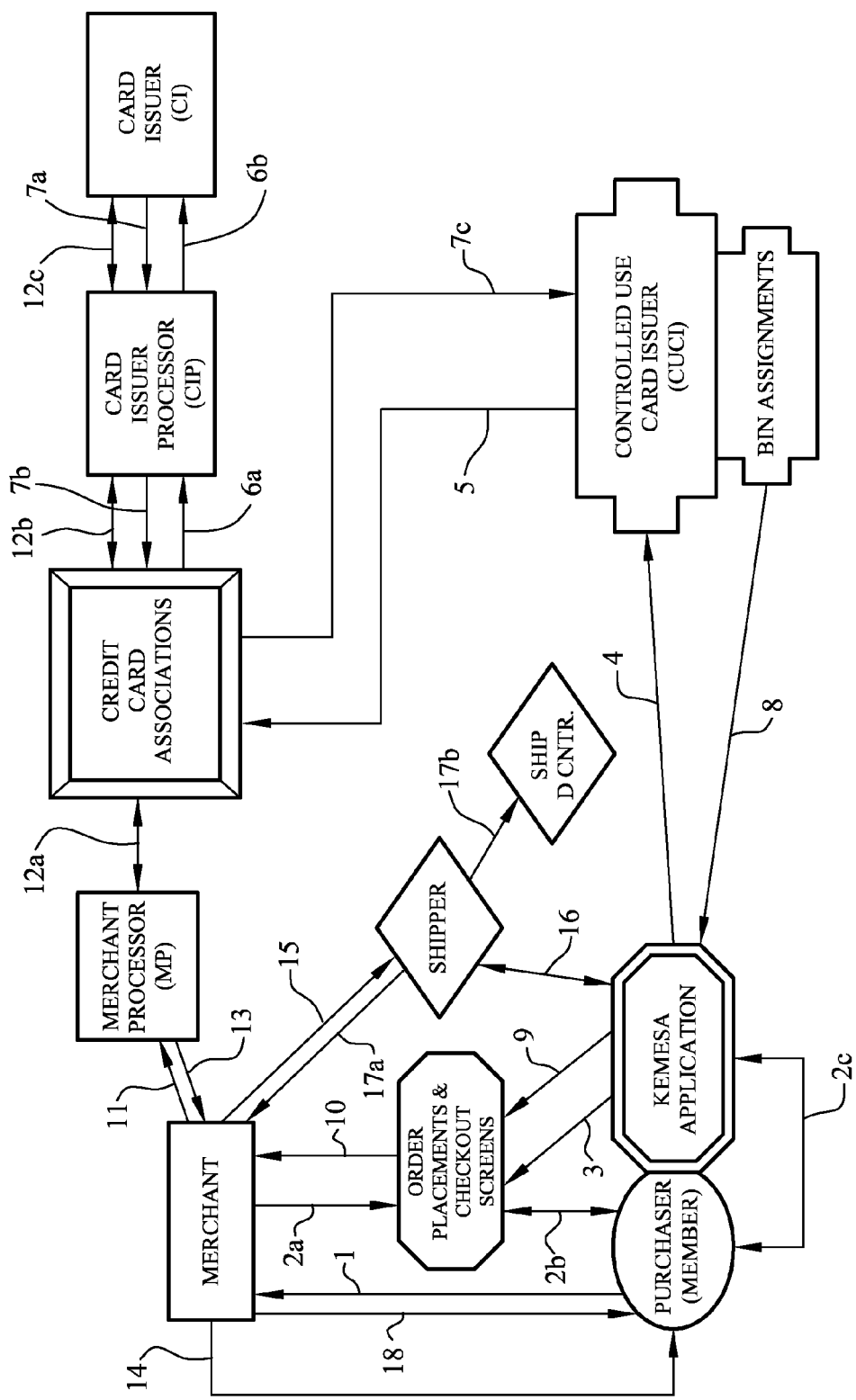
FIG. 1 is a schematic diagram illustrating a sequence of authorization operation of the personal identity theft protection system and method throughout an online ("card-not-present") purchase transaction in accordance with a preferred embodiment.
Figure 2:
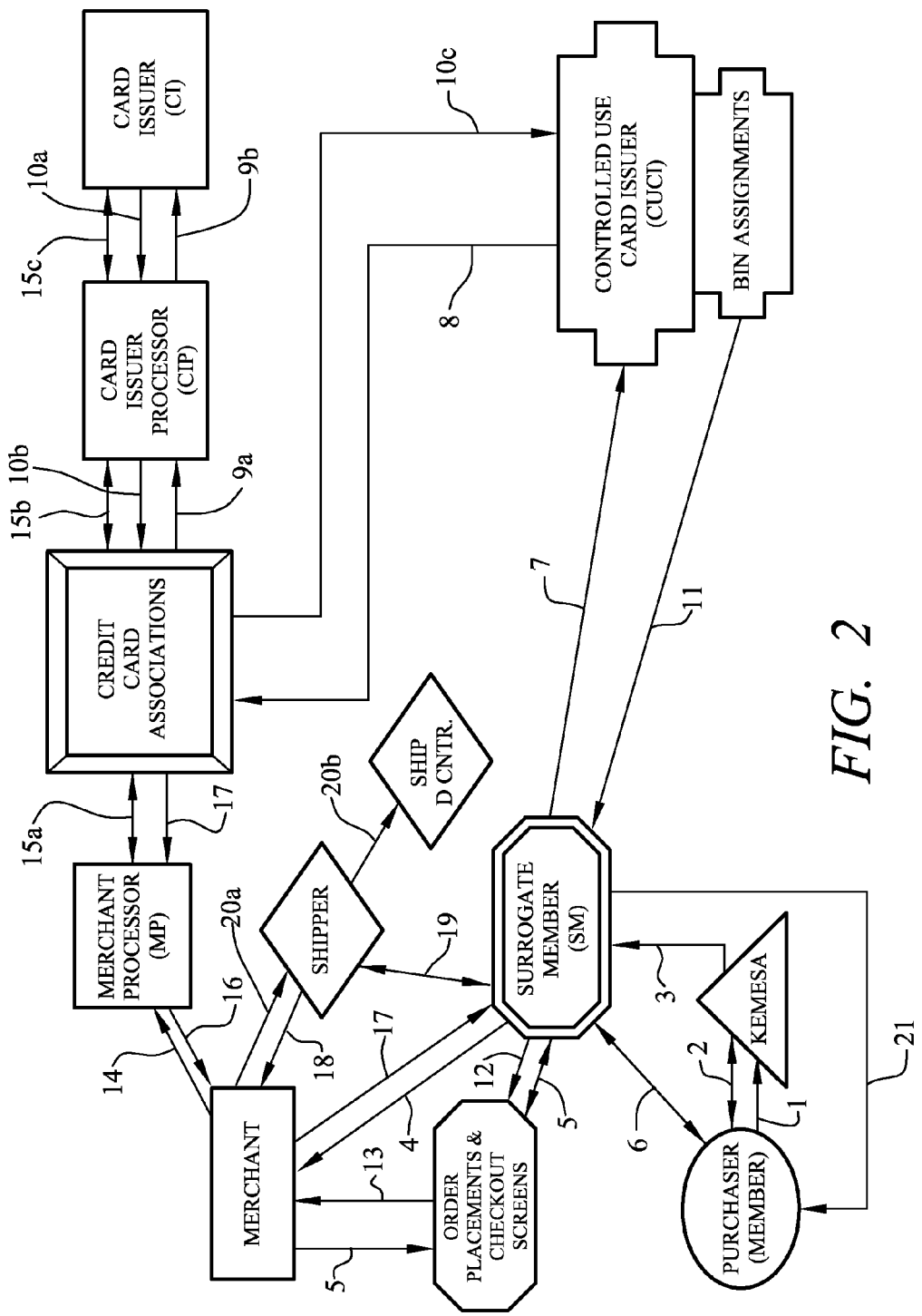
FIG. 2 is a schematic diagram illustrating a sequence of authorization operation of the personal identity theft protection system and method throughout an online ("card-not-present") purchase transaction, wherein a Surrogate Member acts on behalf of the Member as a secured purchase hub, in accordance with an alternative embodiment of the invention.
Figure 3:
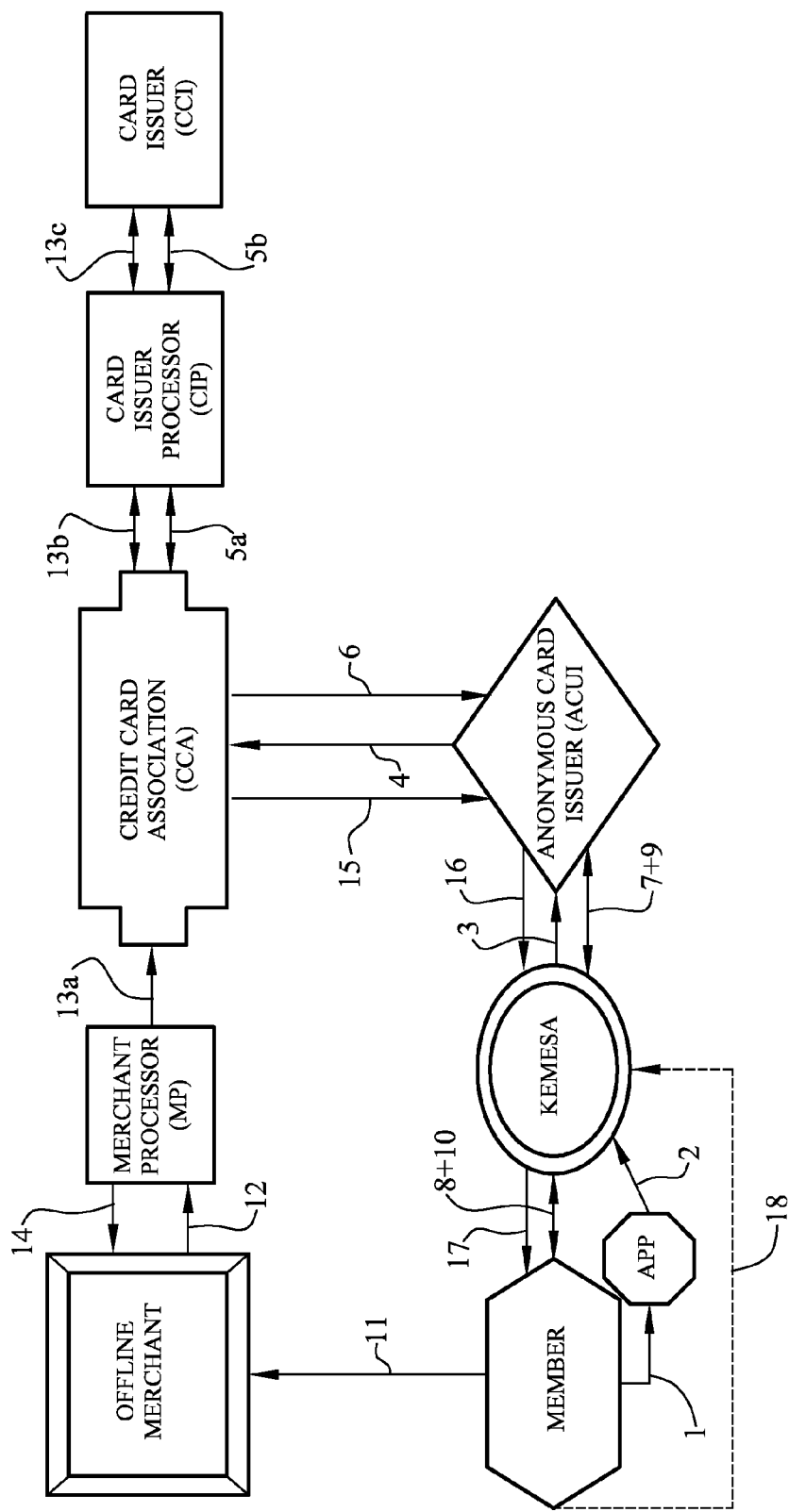
FIG. 3 is a schematic diagram illustrating a sequence of operation of the personal identity theft protection system and method for conducting offline (card-present) purchase transactions, in accordance with a preferred embodiment thereof.

The invention provides a system and method for preventing personal identity theft when making purchase transactions, entering registration information for a Merchant or other third party organization, and during identity authentication procedures. The system and method operate to prevent theft of personal identity when conducting online purchase transactions, such as on the Internet, as shown in the embodiments of FIGS. 1 and 2. A further embodiment of the invention provides for protection against theft of personal identity when making offline purchase transactions, such as when purchasing goods at a retail store or services, as schematically shown in FIG. 3. Throughout the description which follows, the invention is also referred to as the "Identity Management Protection System" or the "System". In all instances, the Identity Protection System provides universality with respect to the form of payment, Financial Institutions for funding transaction, location of use, choice of Merchant, website access, electronic devices, operating systems ("platforms") and Internet access and browser choice, as well as other aspects. The universality of the System allows for ease of use and access to the System by any user from virtually any location.

Online Transactions

Referring initially to FIG. 1, a primary embodiment of the invention is shown, wherein identity theft protection is provided during online purchase transactions. A Purchaser desiring to use the Identity Protection System to make secure, identity-protected purchases via a computer or other electronic device connected to a global computer network, such as the Internet, must first subscribe and become a Member user of the Identity Protection System by registering online or over the telephone. When registering, the applying Member must provide relevant personally identifiable information to the Identity Protection System which includes, but is not limited to, the person's name, billing address, email address, shipping address, telephone number and financial account information, based on the Member's preferred choice(s) of payment, such as, but not limited to, credit card account numbers for any one or more credit cards and/or debit cards, bank account information for direct debit or Automated Clearing House (ACH) payment, e-currency account information, or electronic funds transfer. Once registered, the new Member is assigned a user name and password. The Identity Protection System secures the Member's personally identifiable information and stores this information at one or more highly secure data storage locations. In a preferred embodiment, all personally identifiable information of Members is encrypted using best available encryption techniques for storage at the one or more locations. According to the best mode of the invention at the filing of this application for patent, the information is encrypted using AES256 encryption and is stored in multi-layered encryption for added security. The System may also fragment the encrypted information data prior to storage at multiple locations to further enhance security. Thus, even in the highly unlikely event a piece of encrypted and fragmented data is wrongfully acquired and decrypted, it would be of no meaningful use to a thief.

Referring now to FIG. 1, the Identity Protection System is used to provide personal identity protection during online purchase transactions conducted by the Member. The steps carried out by the System and method of the invention, as depicted in FIG. 1, are indicated by arrows and identified with reference numerals. To begin, at step 1, a Member who has registered for the Identity Protection System of the invention, and has either accessed the system held in the secure cloud, or downloaded the System software application (hereafter also referred to as the "System application") onto the Member's personal computer or other electronic device or has chosen to use the System by selecting the System icon on a computer (i.e. on the desktop, task bar, browser, or tray) or on the display of a handheld electronic device, is at a Merchant's website ready to make a purchase.

Once the Member has selected the purchase item(s), the Merchant activates an order placement screen (see step 2a) which asks whether the Member is a new or returning customer of the Merchant website. In all cases, however, Members of the Identity Protection System will be instructed to check or click on the "new customer" option during their first use of the Identity Protection System at any Merchant website so as to protect their anonymity. This serves to eliminate the possibility of any connection with a Member's real personally identifiable information the Merchant may have on file from prior visits by the Member to that Merchant's website. When the Member clicks "new customer", indicated by 2b or, after the first use of the System at a given Merchant website, has the System indicate that he is a returning customer, the next order placement screen issued by the Merchant normally becomes secure. This automatically activates the System software application or the user activates their account by logging in. The System application then performs a two-way multi-factor authentication (MFA) step to ensure the Member that he/she is working with the Identity Protection System application and, also, to assure the System that the person using the System is, in fact, the Member. This can involve presenting the Member with a pre-selected image and word (chosen by the Member during the registration process or by a secure virtual token system). The Member is then requested to provide his user name and password. The System can employ other Member-identifying authentication measures such as asking the Member questions (e.g. where were you born?) as well as verifying the Member's IP address, cell phone calling number, computer operating system, and other identifiers that are unique to the Member. From this point forward, all purchases at that particular Merchant website will be conducted with the use of the Identity Protection System of the present invention, wherein maximum Member anonymity is provided throughout the purchase process.

As an added level of security, the Identity Protection System provides virtual passwords unique to each Merchant and, in the preferred embodiment, unique to each transaction. This is achieved by the System assigning Merchant, and preferably transaction-specific, passwords that are virtual (unknown) to even the Member. However, these Merchant or transaction-specific passwords, although virtual to Members, will always be conveniently accessible to Members through the use of their unique, single-System username and strong password which was chosen by the Member at the time of registration. A strong password is defined to be a password that is difficult to detect by both humans and computer programs, effectively protecting data from unauthorized access and typically consists of at least six characters (and the more characters, the stronger the password) that are a combination of letters, numbers and symbols (@, #, $, %, etc.) if allowed. Passwords are typically case-sensitive, so a strong password contains letters in both uppercase and lowercase. Strong passwords also do not contain words that can be found in a dictionary or parts of the users own name. The use of virtual passwords provides an added level of security because, if stolen, a virtual password is at best useful only for fraudulent transaction with a single Merchant. However, in the preferred embodiment, wherein virtual passwords are used for each transaction, the virtual password is of no value if stolen. The transaction-specific virtual password is unique to a transaction that has been completed. Thus, a transaction-specific virtual password, once used by the Member, is of no use because it will not be accepted by any Merchant for any transaction in the future.

Next, the System software application proceeds to automatically fill in the new customer information on the order placement screen, as requested by the Merchant. The Member chooses whether to provide his/her real personally identifiable information or anonymous personally identifiable information, and instructs the System software application accordingly. This may occur as a result of a prompt by the System software application to the Member, requesting confirmation as to whether the information provided to the Merchant should be real (actual) personally identifiable information or anonymous information. If the Member indicates that the personally identifiable information should be anonymous, the Member is asked again by the System application to confirm this selection and indicate whether to provide maximum or totally anonymous personally identifiable information. This confirmation request allows the Member to take into consideration whether there is a need to know actual personally identifiable information in order to complete the transaction, such as in the purchase of airline tickets. In the preferred embodiment, the Member can establish Merchant specific anonymity profiles that allow the Member to retrieve a specific profile when revisiting a Merchant website. Thus, the Member can establish multiple anonymity profiles, each with a different level of security (anonymity) for use with subsequently visited Merchant websites. Irrespective of the level of anonymity, the System is always able to determine the Member's personal identity. This may be important for Homeland Security concerns and other security issues that require Member identification.

In a preferred embodiment, the Identity Protection System replaces the Member's telephone number(s) with number(s) that connect only to the Identity Protection System's Contact Center. In the event a Merchant calls this number(s), the Merchant will be placed in contact with a System representative at the Contact Center who is able to identify the Member being called. The representative may contact the Member if necessary. The System representative, therefore, is able to respond appropriately to the Merchant on the Member's behalf, determine whether the Member needs to be contacted and have the contact information available if it is necessary to do so.

The Member provides the System application with instructions as to which form of payment (e.g. any credit card, debit card, bank account withdrawal via automated clearing house from any bank account of the Member, direct debit from an established Member bank account, e-commerce account, electronic funds transfer) he/she wishes to use, the level of fraud protection desired for the purchase (e.g. entirely anonymous, real name only, full personally identifiable information, etc.), the Merchant's name, and the amount of the purchase. The System application then instructs (indicated as step 4) a Controlled Use Card Issuer (CUCI) to acquire a Controlled Use Card Number having an anonymous identity and limited value with no traceable connection to any other financial account. The Member is then given a choice of the type of Controlled Use Card (CUC) to be used for the purchase. The CUC may be a one-time use card for the exact purchase amount or a multi-purpose card that may have any of a variety of use limitations such as, for instance, a limited use to make purchases at a specific Merchant site that is frequently visited by the Member or a subscription service that the Member has committed to, such as monthly online movie rentals. The multi-purpose use card allows for multiple purchases during the same session or future dates. If the Member chooses a one-time CUC card, it will be usable only by the specified Merchant for the date and time of the present purchase transaction. Thereafter, the assigned CUC number is deactivated and is of no value. On the other hand, a multi-purpose CUC card may have any of a number of variables, such as, for instance, money limits (transaction size, time specific and CUC card maximum purchase value), number of transactions permitted (both time specific and card maximum), expiration date, individual Merchant use, or categories of Merchants. As noted above, the multi-purpose CUC card may be limited to use for paying a subscription service that the Member belongs to, such as a monthly online movie rental subscription.

The Controlled Use Card Issuer then initiates the creation of the CUC with an associated CUC number and assigned value by following established credit card processing protocols. Specifically, the CUCI communicates with a Credit Card Association (indicated as step 5) to request approval of the transaction associated with the CUC. The Credit Card Association then communicates with a Card Issuer Processor (as indicated at step 6a). The Card Issuer Processor in turn communicates with a Card Issuer (see 6b) for approval of the transaction having an attached dollar value credit amount. Once approved, the Card Issuer sends the approved transaction to the Card Issuer Processor (see 7a), which in turn routes the approval through the Credit Card Association (7b) and back to the Controlled Use Card Issuer (7c). The Controlled Use Card Issuer ("CUCI") then assigns a number to the approved CUC, selected from a BIN of pre-assigned numbers, and sends the specific Member-selected Controlled Use Card details (including the CUC number) to the System application (indicated as step 8). The System application is now ready to fill in the correct CUC number and the remaining information required to the Merchant's checkout screen. In an alternative embodiment, the CUC simply issues the CUC and the Merchant requests approval in the same way he would for any credit card transaction.

Figure 6:
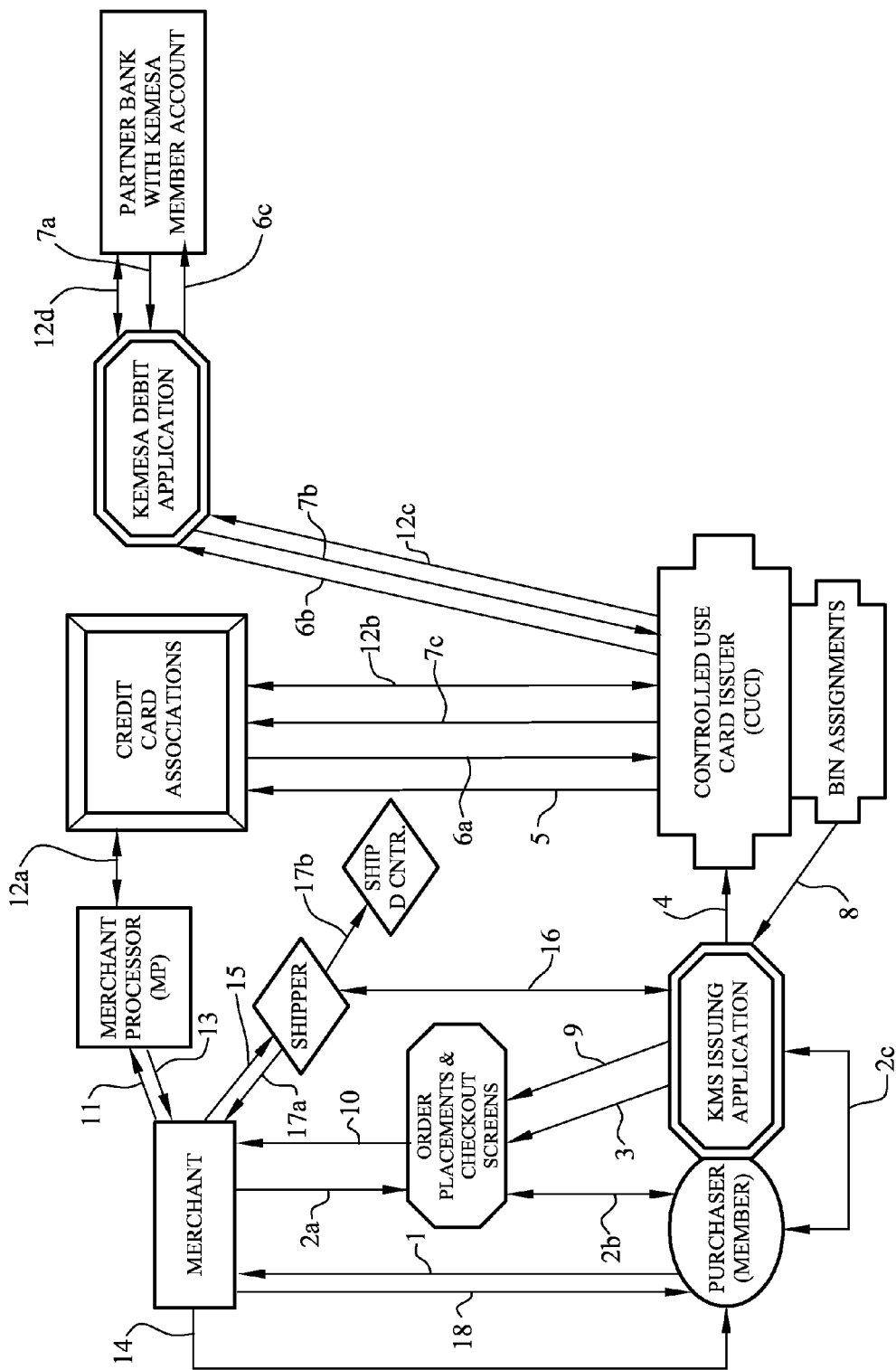
FIG. 6 is a schematic diagram illustrating a sequence of authorization operation of the personal identity theft protection system and method throughout an online ("card-not-present") purchase transaction similar to the embodiment of FIG. 1 with the exception of the credit authorization and funds for transaction payment being acquired from a Member account at a partner bank of the system via a direct debit payment.
Figure 7:
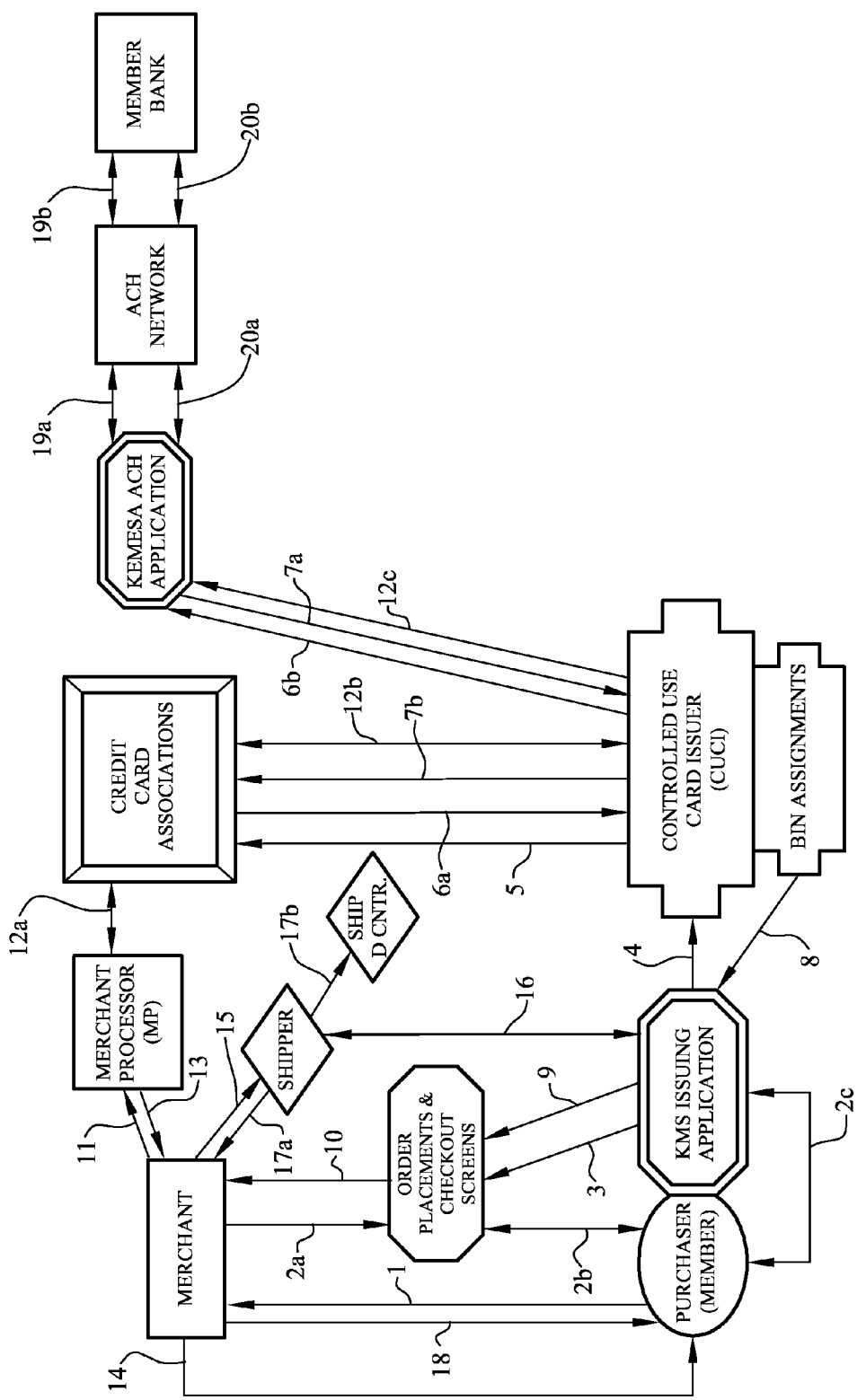
FIG. 7 is a schematic diagram illustrating a sequence of authorization operation of the personal identity theft and protection system and method throughout an online ("card-not-present") purchase transaction similar to the embodiments of FIGS. 1 and 6 with the exception of the credit authorization and funds for transaction payment being acquired from any bank account of the Member via an automated clearing house network.

In several alternative embodiments, as shown in FIGS. 6 and 7, the Member may choose to pay for the purchase transaction directly from the Member's bank account, either by direct debit payment (FIG. 6) or by funds transfer from the Member's bank account via an Automated Clearing House (ACH) network. In either of these embodiments (FIGS. 6 and 7) the transaction is not approved or funded through a Card Issuer. Instead, the Card Issuer Processor and the Card Issuer are removed from steps 6a, 6b, 7a, 7b, 12b and 12c, and the approval and funding of the transaction is from either a Partner Bank (see FIG. 6) or by any other bank (see FIG. 7) where the Member has an active account. In both instances, however, the Member gains added protection when transacting online because of the continued use of a CUC in Merchant interactions, thereby precluding direct access to Member bank accounts as is currently possible with ACH payments. In the embodiment of FIG. 6, the Member has established a direct debit payment account with a Partner Bank of the Identity Protection System. In addition to other benefits, such as reduced or waived System subscription fees, the Member has the ability to pay for a purchase transaction by direct debit payment, wherein the transaction purchase amount is instantly debited from the Member's account with the Partner Bank. The Member must maintain sufficient funds in this account to cover the Member's direct debit purchases. The Member can replenish this account by any form of payment, including credit card cash advance, bank check deposit, money order deposit, electronic funds transfer, cash deposit or any other legal form of account funding.

In the embodiment of FIG. 6, wherein the Member has chosen to pay by direct debit from the Partner Bank account, the Credit Card Association communicates with the Controlled Use Card Issuer at step 6a. Specifically, the Credit Card Association routes the CUC transaction value authorization request to the Controlled Use Card Issuer, which routes the request to the System Debit Application at step 6b. The System Debit Application then communicates with the Partner Bank for approval of the transaction amount. The Partner Bank then sends approval to the System Debit Application (see step 7a), which routes the approval back to the CUCI. Later, the Merchant Processor routes a transaction authorization request through the Credit Card Association, which then routes the request through the CUCI to the System Debit Application and through the Partner Bank, which approves and funds the transaction, see step 12a-12d. The funds are then instantly debited from the Member's account at the Partner Bank. All other steps throughout the online purchase transaction are the same as described in connection with the embodiment of FIG. 1.

Referring to FIG. 7, the Member has chosen to pay for the purchase transaction from any bank account where the Member maintains an active account. In this embodiment, the Credit Card Association communicates with the CUCI for the CUC transaction value authorization request. The authorization request is routed through the System ACH application for approval. The System ACH application sends approval back to the CUCI and to the Credit Card Association (see steps 7a and 7b). Later, the Merchant Processor routes a transaction authorization request through the Credit Card Association, CUCI and to the System ACH application for approval. At steps 19a through 20b, the System ACH application requests funds from the Member bank account, via Automated Clearing House network, and the System receives the funds from the Member bank via the ACH network. All other steps throughout the online purchase transaction are the same as described in connection with the embodiment of FIG. 1.

When the System application receives the Controlled Use Card, the Member may be asked to again authenticate that he/she is the actual Member with the use of a multi-factor authentication process according to best known online security identifier standards and methods, which may include, but are not limited to, such steps as entering a Member name and password, answering one or more security questions unique to the Member (e.g. favorite movie), confirming Member selected images and words, and confirmation of the transaction price. This could be done before the application enters the final information into the Merchant's order placement checkout screen as an added layer of authentication. This serves as a further verification to both the Member and the System that the Member is the person making the purchase, that the Member is using the Identity Protection System of the present invention, and that the amount to be paid to the Merchant is correct.

In a preferred embodiment, the System employs a non-repudiation feature as an added measure of security. This is a digital (i.e. electronic) signature that uses a time-stamped electronic audit trail for authenticating Member identity. This provides undeniable evidence that a transaction occurred and identifies the person who conducted the transaction. Once this information has been received from the Member, a purchase-specific payment number (and the CUC number for that transaction) is issued and a transaction number is assigned by the Identity Protection System. The purchase-specific payment number serves as the credit card number for that purchase. For anonymous purchases, the purchase-specific payment number also serves as the tracking device for converting the anonymous shipping address to the Member's real address if shipment is to be made to the Member. The Identity Protection System now proceeds to automatically complete the Merchant's checkout screen, providing only information that is anonymous with respect to the Member (in the case of a fully anonymous purchase), and only the real personally identifiable information that the Merchant needs to know in the case of the non-anonymous purchase (e.g. for airline tickets: passenger name, Purchaser's ticket receiving address).

In all purchase transactions, the Member's real financial information (e.g. credit card number(s), bank account number(s), etc.) is not revealed and the transaction is made with a controlled use card. For a fully anonymous purchase, the entries will usually include an anonymous, but System-linked "virtual" name, a fictitious email address and any other required information, including payment information and a fictitious shipping address. From the Member's perspective, as well as the Merchant's perspective, the purchase transaction appears as any conventional online purchase transaction. For purchases that are not fully anonymous, entries will vary depending on the Merchant's "need to know" certain information and what the Member chooses to share with the Merchant.

In one embodiment of the invention, the Identity Protection System provides Merchants with a shipping address that is at a central (hub) receiving location established and operated by the System. The shipping label includes all or part of the CUC number or other means for the System to identify the Member. When packages from Merchants arrive at the central receiving location, the System identifies the Member and the Member's transaction from the coded information on the Merchant's shipping label and determines the real shipping address according to the Member's instructions at the time of purchase. The package is re-labeled with the Member's shipping address at the central receiving location and shipped.

In another embodiment of the invention, when an anonymous (fictitious) shipping address is entered into the shipping address field, the System application will include all or part of the Controlled Use Card number entered as part of the anonymous shipping address. This will later serve as a signal to the Shipping Company (selected by the Merchant) that it needs to verify the correct shipping address with the Identity Protection System before issuing a shipping bar code to the Merchant's distribution center/agent (described further below in connection with steps 15-17).

The completed checkout screen is now ready to be sent to the Merchant for order processing. It should be noted that when the Member's encrypted personally identifiable information is required for the purchase transaction, the Identity Protection System retrieves the Member's personally identifiable information from the highly secured data storage location(s) and decrypts the information only for the limited time and use necessary for the transaction. The System assembles the randomly fragmented personally identifiable information data, using encrypted code techniques, and only for the limited time needed for the transaction. Additionally, almost all Merchants on the Internet provide anti-fraud measures to protect the transmission of the information during the time of transmission. If fragmenting is used, according to one embodiment of the invention, defragmentation of a Member's personally identifiable information is accomplished by a code matching process that brings together otherwise useless randomized fragments which are kept encrypted at multiple locations (preferably at least three separate locations). Only when the randomized fragments are correctly defragmented and connected in a secure encrypted environment, for the brief moment necessary to complete the transaction, do they provide meaningful personally identifiable information. Additionally, the System may incorporate the use of a "key vault" that provides periodic changing of key codes in the correct connection of fragmented data to further prevent access by criminals, hackers and the like. In any case, the Identity Protection System's architecture does not allow a Member's personally identifiable information to be stolen from a Merchant's or other third party central database, thereby precluding exposure to the majority of identity theft situations.

Upon receipt of the completed checkout screen (see step 10), the Merchant processes the order following established protocols. Processing proceeds as it normally would in any online purchase transaction. The Merchant sends a transaction authorization request to the Merchant Processor (indicated as step 11). This request is then routed through the established processing system, initially to the Credit Card Association, then to the Card Issuer Processor and the Card Issuer. The Card Issuer approves (or denies) the transaction. The transaction approval/denial is then routed back to the Card Issuer Processor, the Credit Card Association and finally back to the Merchant Processor (indicated at steps 12a, 12b, 12c). The Merchant Processor then notifies the Merchant that the transaction has been approved (see step 13). The Merchant then notifies the Member (step 14) that the transaction has been approved, processed and completed.

Once the Merchant is notified that the transaction has been approved, the Merchant releases shipping instructions to a designated Shipper (indicated as step 15). In one embodiment, wherein the purchase is made as an anonymous purchase, the System application enters the Controlled Use Card Number into the shipping address field of the Merchant's checkout screen. [It should be noted that in at least one embodiment where the Merchant sends the package to the Member (i.e. not to the System's central receiving location), all major Shippers will be provided with a special reading device to detect the Controlled Use Card Number when it appears in the shipping address field]. The special reading device provided to the Shipper will identify this now inactive Controlled Use Card Number in the shipping address field and, when detected, the Shipper is routed, via the special reading device, to the Identity Protection System. The Identity Protection System then translates the Controlled Use Card Number into the Member's correct/real shipping address and provides the Member's real shipping address to the Shipper (indicated as step 16). The Shipper then electronically transmits a scannable shipping label bar code to the Merchant and the correct (real/actual) shipping address to the Shipper's distribution center. The distribution center prints the shipping label and "over-labels" the package. It should be noted that only the Shipper obtains the Member's correct name and address, and not the Merchant. The Member's real name and address is never entered into the Merchant's primary database and is never identified, recognized, or made known to the Merchant.

The package is first transported from the Merchant to the Shipper's distribution center. At that time, the packaged is "over-labeled" with the Member's real name and shipping address, or other person and address specified by the Member. The Shipper's delivery vehicle picks up the package containing the purchased item(s) of the Member from the Shipper's distribution center for delivery to the Member or other address provided by the Member. At this stage, and up until delivery of the item(s), the Merchant sends shipment tracking information to the Member using the anonymous email address provided by the Identity Protection System when completing the order placement checkout screen. The System software application converts the anonymous email address to the Member's actual email address so that the Member receives the email tracking information from the Merchant. In an alternative embodiment, the System offers a Premium Service option that takes responsibility for tracking as well as other service dimensions like full customer service for any disputes with Merchants or Shippers.

In the other embodiment, as described above, the packages of all Members are initially shipped to one or more central receiving locations operated by the Personal Identity System where the packages are re-labeled or "over-labeled" and shipped to the final shipping destination.

In another embodiment, the Member may provide an actual shipping address. Because the Merchant will not know whether this is the Member's address or another address (e.g. a gift recipient's address), the Member's personally identifiable information will not be compromised.

If a Member has not chosen the System Application default setting during the registration process and decides to make an online purchase using the Identity Protection System of the present invention, the Member may select the Identity Protection System Icon installed on the Member's electronic device (e.g. desktop computer, laptop computer, handheld computer device, cell phone, etc.) after registration. Upon clicking on the System icon, the Member is prompted to enter his/her user ID and password. Once this has been done, all other steps, as described above, remain the same. In the instance the Member is located away from his/her Home PC, and the Member wishes to make a purchase on the Internet using the Identity Protection System, the Member may go to the Identity Protection System website. At the System's website, the Member is prompted to enter his/her user name and password and a form of multi-factor authentication (e.g., virtual token) according to best available security identification protocol. This enables the Member to access his/her account from the System website and proceed to use the Identity Protection System from any computer, proceeding through the purchase transaction in the same manner as the Member would from his/her Home PC. All other steps performed in the purchase transaction are identical as described above in connection with FIG. 1.

Referring now to FIG. 2, an alternative embodiment of the online product purchase transaction process of the Identity Protection System is shown schematically. In this embodiment, the Identity Protection System acts on behalf of the Member from a completely separate Internet address/location (hereinafter also referred to as "Surrogate Member"). According to this embodiment, the Member first downloads software that allows the Member to connect to a Surrogate Member online when making purchases. Thereafter, the Member simply communicates with Merchants and other online purchase sites exclusively through the Surrogate Member which could be a secure browser. Merchants and all other parties involved in the purchase also communicate exclusively through the Surrogate Member throughout the purchase transaction. In this embodiment, the Surrogate Member may be a server on the Internet, acting as a "secure purchase hub" through which all purchase-related communications with the Member are directed in order to maintain Member anonymity and personal identity security. Just as in the primary embodiment of FIG. 1, the Member, acting through the Surrogate Member, is not required to communicate any differently with a selected Merchant website than is done during a conventional online purchase transaction.

In the online purchase transaction according to the embodiment of FIG. 2, the Member initially connects to the Identity Protection System by clicking on the System's icon on the Member's computer or other electronic device (indicated as step 1 in FIG. 2). Next, the Identity Protection System requests the Member's user name and password (indicated as step 2). Once the user name, password and MFA Authentication (e.g., virtual token) are received and verified, the Identity Protection System connects the Member to the Surrogate Member (see step 3). From this point forward, the Surrogate Member acts as a hub, initiating and responding on behalf of the Member with all entities involved in the desired purchase transaction.

At the Member's direction, the Surrogate Member acts on the Member's behalf as the Member searches the Internet until the desired item(s) to be purchased is selected by the Member (indicated as step 4). The Merchant then sends the order placement screen (see step 5) and the Surrogate Member checks the "new customer" option. Next, the Surrogate Member begins to provide all of the required information (see step 5*a*) in the order placement screen of the Merchant. The Surrogate Member then requests and receives the shipping address from the Member (see step 6). This is the address to which the Member desires the purchased item to be shipped. This address may or may not be the Member's address. For example, the Member may be purchasing an item to be shipped as a gift to another person, such as a friend or relative.

Next, the Surrogate Member requests the Controlled Use Card Issuer to initiate creation of the Controlled Use Card (see step 7). The Controlled Use Card Issuer then requests transaction authorization through the Credit Card Association (see step 8). Similar to the embodiment described in connection with FIG. 1, the Credit Card Association then routes the authorization request to the Credit Card Issuer Processor (9*a*), from which the request is further routed to the Credit Card Issuer (see step 9*b*) for approval. The Credit Card Issuer then sends approval of the transaction to the Card Issuer Processor (step 10*a*). The Card Issuer Processor then routes the approval through the Credit Card Association (step 10*b*) and to the Controlled Use Card Issuer (step 10*c*). The Controlled Use Card Issuer then assigns a number to the CUC, selected from a BIN of numbers, and sends the approved Controlled Use Card number to the Surrogate Member (see step 11). In an alternative embodiment, the Controlled Use Card Issuer simply issues the CUC number. The Merchant then requests transaction authorization as with a conventional credit card.

The Surrogate Member completes the Merchant's checkout screen, entering the Controlled Use Card number into the credit card field on the checkout screen. For anonymous purchases, the Surrogate Member also enters the Controlled Use Card number into the shipping field address on the Merchant's checkout screen (see step 12). The Merchant then receives the completed checkout screen from the Surrogate Member (step 13).

The Merchant asks the Merchant processor to obtain transaction approval (step 14). In the same manner as described in connection with the primary embodiment of FIG. 1, the approval request is routed through the Credit Card Association and Card Issuer Processor to the Card Issuer (steps 15*a-c*). The Card Issuer then approves (or denies) the request and routes the approval/denial back to the Merchant processor (steps 15*a*-15*c*).

The Merchant processor then advises the Merchant of transaction approval (indicated as step 16). The Merchant then advises the Surrogate Member that the purchase is complete (see step 17).

Next, the Merchant sends the Shipper all shipping information which was previously provided by the Surrogate Member (see step 18). For anonymous purchases, the Controlled Use Card number in the shipping address field signals the Shipper or the System (i.e. in the event the System operates a centralized package receiving location) to obtain the correct name and address from the Surrogate Member (see step 19). The package is then "over-labeled" with the correct name and shipping address and is shipped to the ultimate destination (see step 20). The Surrogate Member then advises the Member that the purchase is complete and the package has been shipped according to the Member's instructions (step 21).

Figure 4:
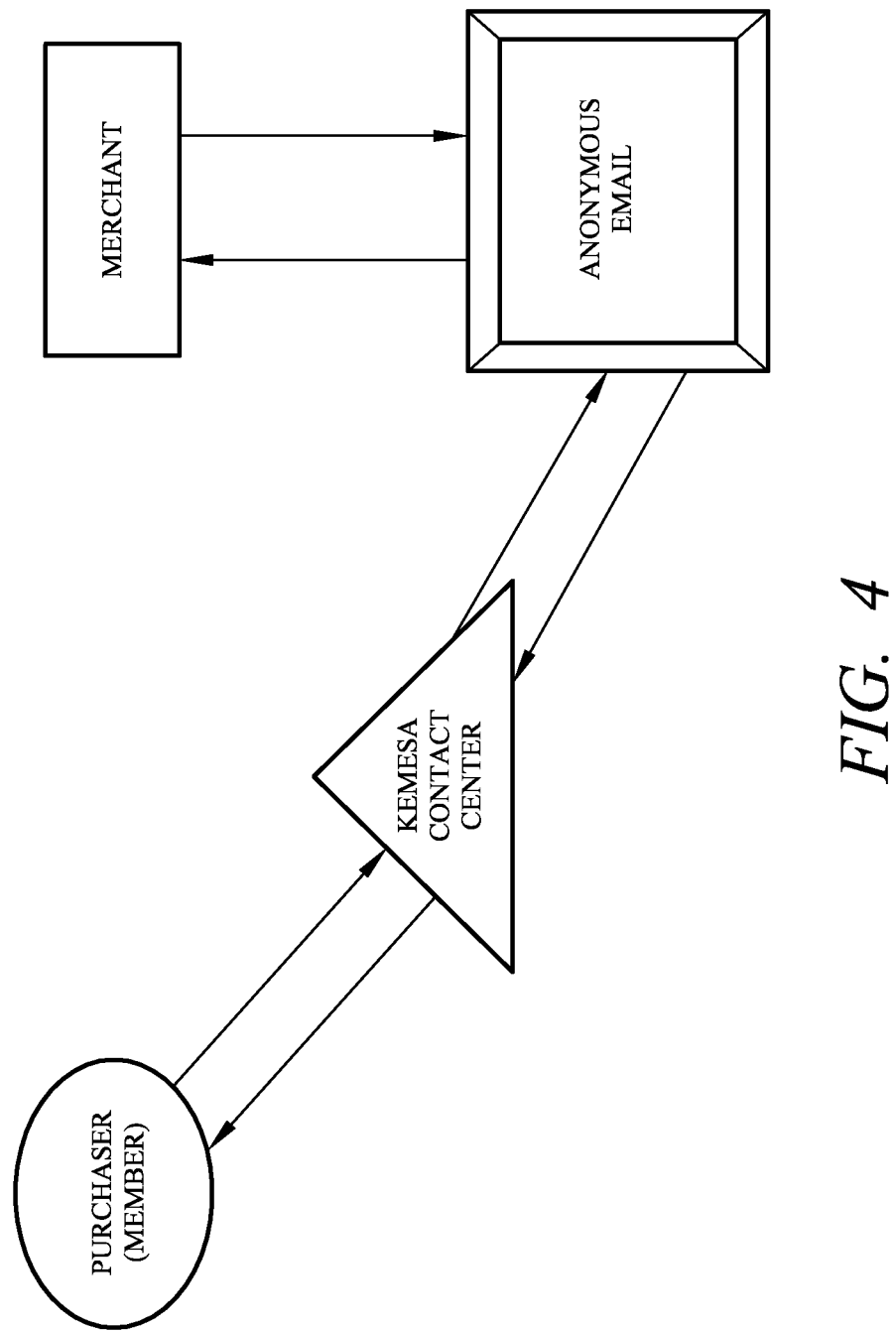
FIG. 4 is a schematic diagram illustrating a sequence of operation of anonymous email communication between a Purchaser/Member of the personal identity theft protection system and online Merchant or company.

Referring to FIG. 4, a schematic diagram illustrates communication between a Merchant and Member using an anonymous email feature of the Identity Protection System. As noted above, when the Member conducts a purchase transaction with an online Merchant, the Identity Protection System provides anonymous information to the Merchant. This anonymous information includes an anonymous email address so that the Member's real (actual) email address is never revealed to the Merchant. Subsequently, if the Merchant attempts to contact the Member, using the anonymous email address provided to the Merchant by the Identity Protection System, the Merchant's email message is forwarded to the Identity Protection System Contact Center for handling. As shown in FIG. 4, the System Contact Center may forward the email message onto the Member. If the Member opted to accept such emails at the time of registration with the System, the Member will receive the forwarded email. Next, the Member may respond to the Merchant's email message and send a reply email which is routed through the System Contact Center to the Member's anonymous email. The anonymous email then sends a message to the Merchant containing the Member's reply. Alternatively, the Member may elect to have any or all email messages sent to the Identity Protection System website. The Member can then access his/her account after providing the Member's password and other security authentication information. Once the Member has accessed his account, he can retrieve and reply to emails while maintaining complete anonymity. By directing email messages to the System website, the possibility of undesirable occurrences on the Member's computer is diminished.

Figure 8:
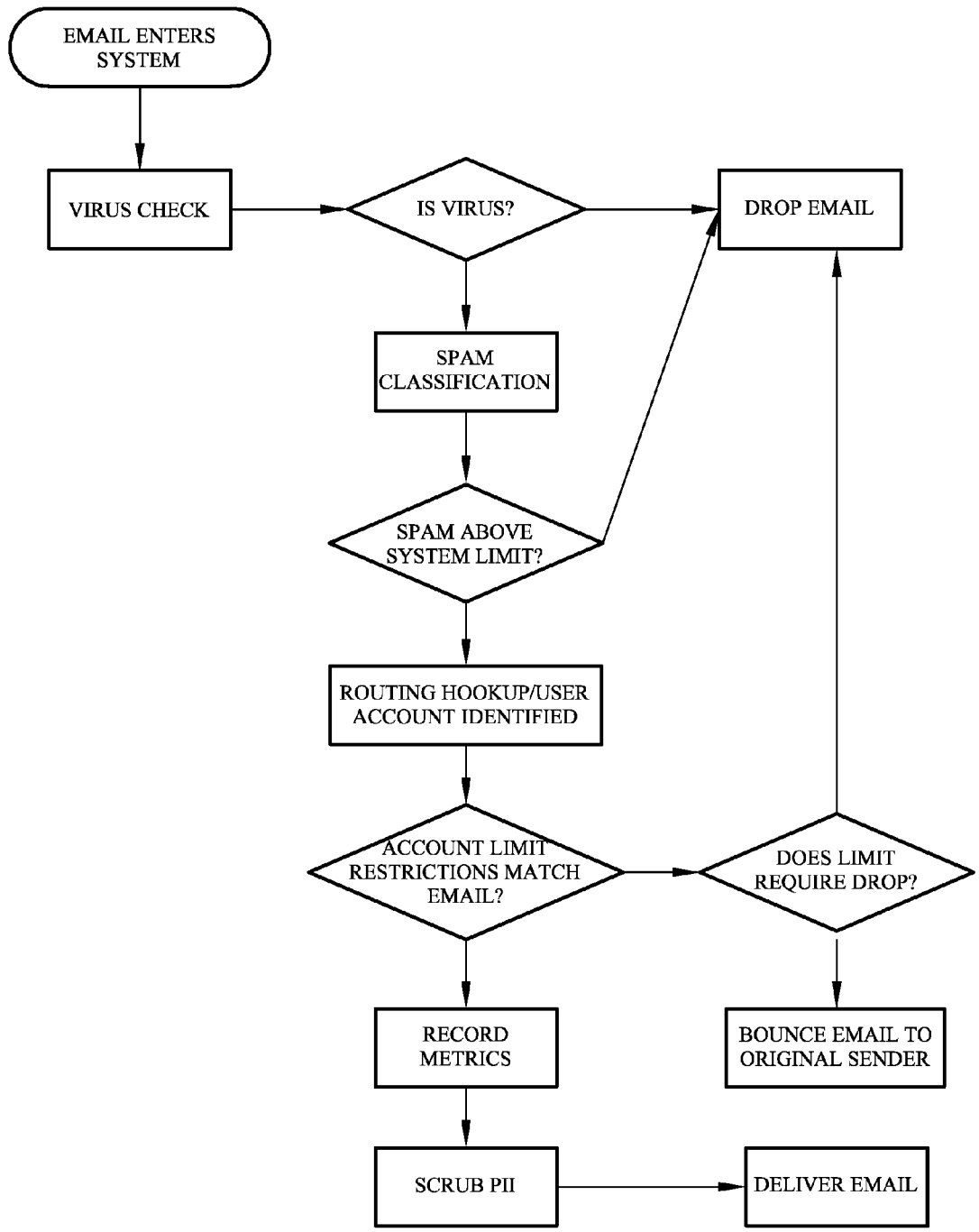
FIG. 8 is a schematic diagram illustrating a sequence of operation of anonymous email communication sent to a Member of the personal identity theft protection system from an Original Sender.

In another embodiment of the anonymous email feature of the Identity Protection System, a bi-directional email communication link is created between a Member's source email account and a target destination e-mail account. The target destination email account can belong to an individual person, a merchant, or any other entity. A virtual email account is generated by the Identity Protection System—either at random or selected from a pre-defined selection of maintained domains—which is used by the Member when prompted to provide an email address. Referring to FIG. 8, when an email is sent from the target destination email account to the virtual email account, the email is scrubbed of viruses and checked for spam content before being delivered to the Member's source email account. The routing information from the email sent by the target destination email account to the virtual email account is stored on a server. In order to send an email to the target destination email account, the Member sends an email from the source email account to the virtual email account. The routing information is used to identify and match the source email account with the target email account. The bi-directional link can be monitored to view relevant statistics, such as the number of emails that have been routed, the number of spam and virus-infected emails that have been sent to the virtual email account, and the source of the emails being sent to the virtual email account. The bi-directional link can further be defined to send notifications if a particular event occurs, such as an email being sent to the virtual email address from a source that is outside of the Member's intended purpose of the virtual email account, or an email account having unidentified routing information. The bi-directional email communication link does not have any defined limits regarding the number of source email accounts and target destination email accounts. There are also no limits on traffic handling.

Figure 5:
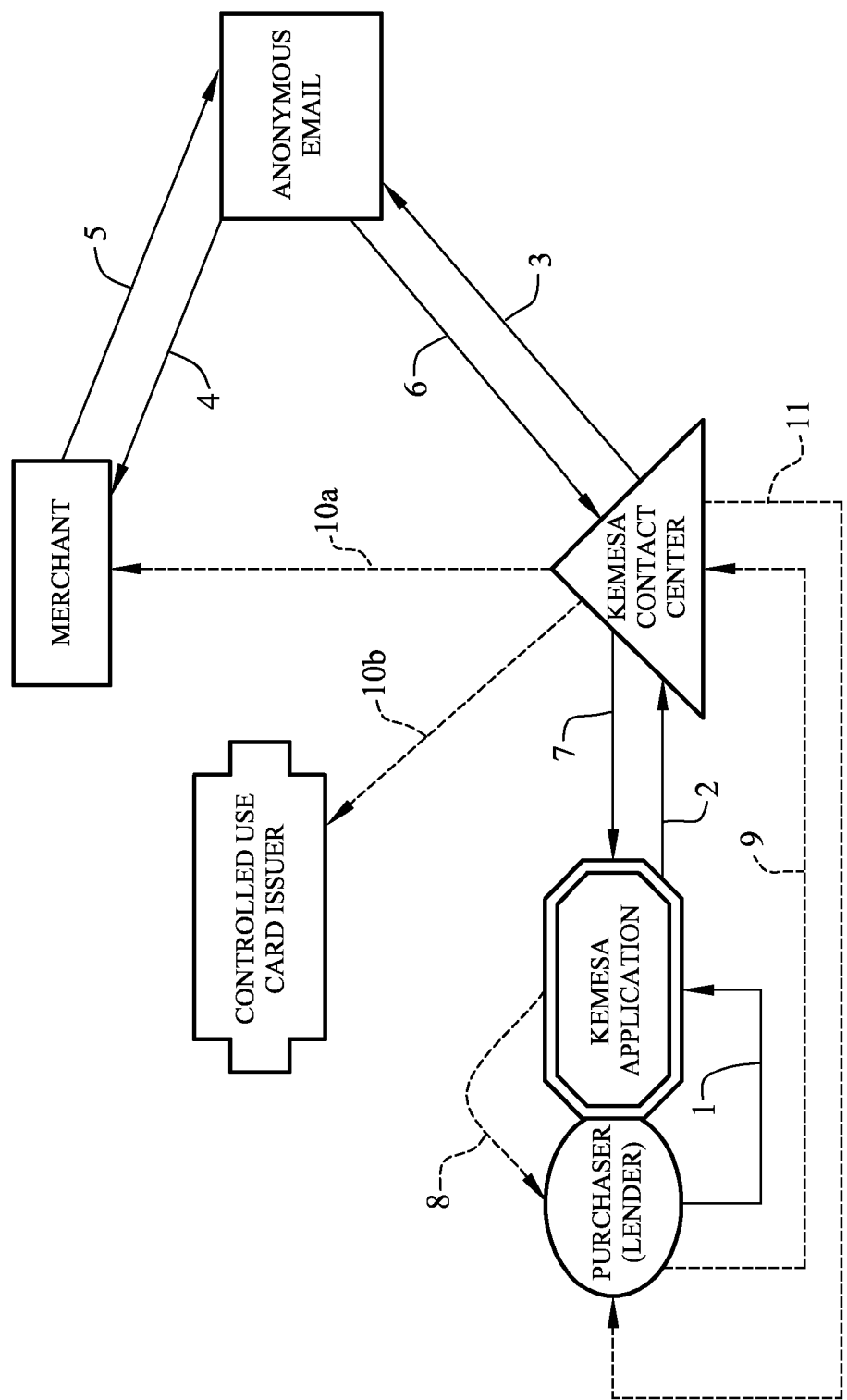
FIG. 5 is a schematic diagram illustrating a sequence of operation performed by the system to handle Customer/Member service issues between a Member and an online Merchant or company.

Referring now to FIG. 5, a schematic diagram is shown to illustrate a typical customer service process of the Identity Protection System for use in online (card-not-present) transactions. Because contact with Merchants in the online version of the System will in most cases be through anonymous email addresses and anonymous phone numbers, varying levels of customer service are needed. The level of customer service provided to a Member will be decided by each Member and may range from basic (e.g. Member handles all Merchant contact directly by accessing his/her anonymous email address and using the anonymous email to communicate with the Merchant) to advance customer service (e.g. all Merchant communication is routed and coordinated through the System Contact Center).

Because the customer service level is determined by the Member, and some Members will choose the advance option, the System provides a broad range of both Merchant and Member selected customer service capabilities. This includes contact and handling capabilities with Merchants, Shippers, Controlled Used Credit Card Issuers, and the Members themselves. Customer service capabilities include, but are not limited to: purchase responsibility denial; billing disputes; returns; delivery failures; Member help; and account theft and fraud claims. Although most of these services are focused on the online version, some of these customer service capabilities also extend to the offline version (e.g. billing dispute, Member help, lost or stolen cards).

As seen in FIG. 5, a customer service process between the Purchaser/Member and the Merchant involves communication through the System Contact Center. In this example, a Member with a Merchant issue (e.g. return of a purchased item) activates the System application software on his/her computer. The Member selects the free "customer service" option by clicking on the appropriate icon. Alternatively, the Member may use a direct dial telephone option which may require payment of a fee. Next, in step 2, the software application connects with the System Contact Center which addresses specifics of a Merchant issue. The System Contact Center then activates the anonymous email (see step 3) which is on file with the particular Merchant. The System Contact Center composes an email message incorporating the Member's request of the Merchant (e.g. to return the purchased item for a refund). Next, in step 4, the anonymous email is sent to the Merchant. The anonymous email references the order details (e.g. invoice number) along with the specific Member request. In step 5, the Merchant responds to the Member request and sends the reply to the anonymous email. The System Contact Center then receives the Merchant's email (see step 6) and sends the Merchant's email reply to the System software application residing on the Member's computer (see step 7). The System software application presents the Merchant's email reply to the Member (see step 8). In the event the Member is not satisfied with the Merchant's response, the Member can contact the System Contact Center directly, indicated as step 9, to provide further action direction until a satisfactory resolution is achieved. When a resolution is achieved, the System Contact Center communicates with the Control Card Issuer if payment adjustment is required (see step 10*b*). If needed, the System Contact Center also contacts the Merchant on behalf of the Member (see step 10*a*). Finally, in step 11, the System Contact Center provides the Member with details of all actions taken and a summary of any applicable service fees charged.

In addition to the online purchase features described above in connection with the embodiments of FIGS. 1 and 2, the Identity Protection System of the present invention provides the following additional benefits and features:

UNIVERSAL ACCESS TO THE PERSONAL IDENTIFICATION PROTECTION SYSTEM BY ALL CREDIT CARDS

Members may register their anonymous online purchasing accounts with any one or more major credit cards that have an active account in good standing. Once registered, each time the Member initiates a purchase using the Identification Protection System, he/she may choose any previously registered credit card accounts and proceed directly with an anonymous purchase without visiting additional websites or performing any additional steps.

UNIVERSAL FORMS OF PAYMENT

Members may select to fund any purchase transaction from any one or more funding sources such as, but not limited to, any credit card account(s), any bank accounts (via ACH or direct debit), any Internet compatible debit card, e-currency, electronic funds transfer, cash or any other legal form of payment.

UNIVERSAL ACCOUNT ACCESS BY MEMBERS

The Identification Protection System of the present invention may be accessed by Members from any computer (e.g. PC or Apple) or any other electronic device (e.g. cell phone, PDA, land line phone). Members simply activate their accounts through the Identity Protection System's website by entering their Member user name and password and a form of multi-factor authentication according to best available security identification protocol. This enables Members to make anonymous online purchases just as they would from their Home PC or primary computer. Further, the Member can access the System on any computer platform (operating system) and conduct purchase transactions using the System on any Internet browser at any Merchant website. When the Member uses the Identity Protection System away from his/her Home PC, the online purchase transaction is made from the System website. There is no downloading to a satellite computer. However, a detailed record of website-originated anonymous purchases (as well as all other purchases using the Identity Protection System) will appear in the Member's electronic account history.

HIGHLY SECURE MEMBER REGISTRATION

When Members first register with the Identity Protection System from the System's website, they are given the option of registering either online, using best available strong encryption techniques, or offline (i.e. by telephone or mail).

In an alternative embodiment, even if Members choose to register online, their credit card information will only be communicated to the Identity Protection System via secure non-Internet transmission channels that provide higher levels of security. This prevents the Identity Protection System from ever receiving the Member's real credit card accounts online, thereby precluding any chance of online credit card theft during the registration process.

HANDLING OF MERCHANT EMAILS SUBSEQUENT TO ANONYMOUS PURCHASES

In the embodiment of FIG. 2, the use of a Surrogate Member provides Members with the ability to control receipt of Merchant offers, thereby reducing the incidence of unwanted emails. When a Member first registers to become a Member and use the Identity Protection System of the present invention, the Member will be asked if he/she wants to receive Merchant offers by email, as commonly done by online Merchants following a purchase in order to advise the customer of attractive discounts, sales, new products, etc. Members are provided with a choice when registering to "always" see Merchant follow-up emails, "occasionally" receive such emails, or "never" receive such emails. If the Member indicates "never", the Surrogate Member will decline receipt of such offers. If the Member indicates "always", the Surrogate Member will always pass along such offers to the Member. Moreover, if the Member indicates "occasionally", the Surrogate Member will ask the Member for a "yes/no" indication each time he contemplates a purchase using the Identity Protection System.

SPECIAL MERCHANT OFFERS TO PURCHASING MEMBERS

When Members first register for the invention, they will be asked if they would like to receive special offers not generally made available by Merchants either generally or limited to a Member-designated list of Merchants. The Identity Protection System will then invite those Merchants to make such special offers to these high potential customer prospects without compromising their anonymity. Once registered, the Member can change his/her Merchant offer preferences at any time.

SECURE OFFERING TO MEMBERS OF ADDITIONAL PURCHASE ITEMS

After a Member makes a purchase of one or more items, using the Identity Protection System, the Member is presented with additional items that have been dynamically determined to be of likely interest to the Member based on a combination of what the Member previously purchased and state-of-the-art data resource information identifying what persons who made the same or similar purchases are likely to be interested in as well. The Member is offered the opportunity to connect to various other Merchant websites offering those items he has expressed interest in while maintaining the same anonymity (i.e. personal protection). At these linked Merchant websites, a Member has the comfort of knowing that these linked Merchant websites have been pre-approved by the System as being legitimate and secure sites.

ONGOING ACCOUNT HISTORY

The Identity Protection System will provide each Member with the ability to review the details of all purchases made using the invention. This is achieved in two ways: (1) by electronically sending Members a monthly statement of activities; and (2) by providing Members with the ability to electronically access their account history on the Identity Protection System's website. In the event the Members' purchases are paid through the Members' credit card accounts, at the Members' choice, their credit card account statements may provide any chosen level of detail as to the purchases made using the Identity Protection System. Optionally, Members' credit card statements may only indicate the date, amount of purchase and that the purchase was made using the Identity Protection System. Accordingly, this feature allows Members to view details of all purchases made using the Identity Protection System of the present invention, in order to confirm authorized purchases and to reconcile their accounts.

SYSTEM ACCOUNT SHARING

When Members first register to use the Identity Protection System, they will be given the option of allowing other designated individuals ("Associates") permission to use their account. They may also designate a monthly dollar amount purchase limit for each Associate. In any case, a different Password will be assigned to each Associate. In addition, the purchase history for each Associate will be separately reported in the monthly statement and history. The list of associates and their permissions can be changed at any time by the Member.

DEDICATED SYSTEM ONLINE CREDIT CARD

At registration, Members will be asked whether they would like to apply for a special System credit card account as an alternative or in addition to use of other major credit card accounts they may choose to register. This System credit card account will be issued by one or more major Credit Card Issuers of Visa, MasterCard, Discover or American Express. The benefits of this special System credit card account are:

a. Account activity statements will provide the details of purchases made using the Identity Protection System that are not reported in the Members' regular credit card statements.

b. Using the System credit card allows Members to participate in lucrative "Purchase Discounts and Rewards" programs.

c. The special System credit card will be required for Members to participate in anonymous offline purchase capability (described below) which can be used with any retail Merchant having conventional credit card purchase processing equipment with PIN entry capability.

NON-REPUDIATION SECURITY FEATURE

As an added measure of security, the System protects Members from personal identity theft and also protects the System itself from fraudulent use of its services by incorporating a non-repudiation feature. This is a digital (i.e. electronic) signature that uses a time-stamped electronic audit trail for authenticating Member identity. This feature protects Members from personal identity theft because the digital signature can only be used by the Member. The digital signature is always unique to a single individual. Non-repudiation also guards against fraudulent use of the System by providing undeniable evidence that a transaction occurred and by identifying the person who conducted the transaction.

Offline Transactions

Referring now to FIG. 3, a schematic diagram is shown illustrating an offline purchase transaction in accordance with the Identity Protection System of the present invention. In this embodiment, a Member is provided with the ability to purchase products and services offline at any location that has PIN (Personal Identification Number) entry capability, such as at retail stores (e.g. grocery stores, drug stores, clothing stores, etc.) without revealing or compromising any Personally identifiable information. More particularly, the offline purchase feature of the Identity Protection System, as depicted in FIG. 3, allows the Member to conduct a completely anonymous offline purchase transaction.

The previous embodiments described above, as shown in FIGS. 1 and 2, were directed to an online (e.g. Internet) purchasing environment. This particular embodiment of the invention, as shown in FIG. 3, is intended to provide an identity-protected alternative which offers maximum anonymity use for purchases that are not made online. Conventional Credit Cards usually bear the card holder name, a credit card account number, expiration date and access to the entire credit line balance of a given credit card account. Because credit cards are the dominant means by which consumers, both individuals and businesses, pay for purchase transactions when conducting business with retail Merchants, there is a tremendous risk of credit card fraud and identity theft.

The offline purchase feature of the present invention, as described below, provides total purchase anonymity with the use of a physical card that is read by a conventional credit card reading device at a physical point of purchase. However, the physical card provided to the Member does not provide a visible card holder name, account number or expiration date (only accessible by highly sophisticated and secure decryption equipment), nor does this card require Members to provide an authorizing signature. Additionally, Members have the ability to specify the credit value of the card, thereby limiting transactions only up to a card holder designated maximum dollar amount. This provides a security feature by limiting credit line access. Moreover, unlike conventional credit cards, Members can use any funding source (e.g. any one or more credit cards, any bank account, electronic funds transfer, cash or any other legal form of payment) to obtain the stored value assigned to the fully anonymous stored value card. Unlike some credit card purchases that do not require signature when the transaction is below a defined threshold (e.g. McDonald's, Burger King, Starbucks, etc.), the stored value card requires no signature regardless of the purchase transaction amount.

Referring now to FIG. 3, the sequence of operation of the offline purchase process of the present invention is shown schematically, wherein individual steps of the process are indicated by numbered arrows which correspond with a numbered step sequence.

To begin step 1, according to a preferred and primary embodiment, a Member of the Identity Protection System of the present invention, who has decided to apply for an offline purchasing option of the Identity Protection System, activates the System icon on the Members Home PC, selects the Identity Protection System homepage, and enters the Member's user name and password and a form of multi-factor authentication according to best available security identification protocol. This provides the Member with access to the various options available under the Identity Protection System of the present invention.

In an alternative embodiment, the Member (or non-member) may apply for an offline version of the Identity Protection System by dialing a toll-free telephone number. If the person is an online subscriber, the Member provides his/her user number and password or other forms of multi-factor authentication, as previously discussed. This helps to expedite the registration process for the offline purchase option using the Identity Protection System. If the person is not currently a Member, he/she will need to apply as a first-time user of the System. As previously described in connection with the embodiments of FIGS. 1 and 2, any and all personally identifiable information provided during the registration process (e.g. name, address, assigned Member ID/user name and password, PIN, credit card and other financial account information, etc.), once recorded by the System, is encrypted using the best available strong encryption techniques and stored at one or more locations using sophisticated multi-layered encryption data storage technologies to prevent the possibility of identity theft from a central data storage location.

In still another embodiment of the offline purchase option, a Member or non-member may register for the offline purchase option by accessing the System's website. The remainder of the registration process is the same as described in the previous embodiments.

In step 2, as shown in FIG. 3, the Member, having signed in on the Identity Protection System's home page, selects the option for obtaining the offline purchase version of the Identity Protection System which will afford the Member the same complete anonymity when making offline purchases among all retailers that accept credit cards. More specifically, the Member selects the option to set up an Anonymous Offline (Card Present) Purchase Account (ACP account) and issuance of an Anonymous Card Present (ACP) Card for that ACP account. The Member selects one of his already registered major credit card accounts to which his ACP account will be tied, the maximum dollar amount the ACP account will carry, and the account balance threshold level that will trigger a Member choice of either automatic replenishment or a replenishment request to the Member.

In an alternative embodiment of step 2, a Member may contact the System's toll-free number at any time and, after providing the Member's user name and password and/or other multi-factor authentication information, the Member may request replenishment of his ACP account.

Next, in step 3, the Identity Protection System sends a strong encrypted request to an ACP Card Issuer requesting the creation of the ACP card that has been applied for by the Member.

In an alternative embodiment to step 3, the System's request to the ACP Card Issuer is transmitted over secure non-Internet transmission channels which provide even higher security levels. In either case, however, all ACP account requests are transmitted individually (never in batches), thereby further mitigating exposure to multiple Member identity theft.

In step 4, the ACP Card Issuer requests authorization from the designated Credit Card Association to issue the ACP card. Upon receipt of the authorization request, the Credit Card Association routes the authorization request as it normally would in any stored value card request. Accordingly, no change in established authorization procedure protocol is required. As indicated in steps 5a and 5b, the authorization requested is routed through the Issuer Processor to a Credit Card Issuer. When the Credit Card Association receives approval from the Credit Card Issuer, routed through the Issuer Processor, the Credit Card Association notifies the ACP Card Issuer, see step 6.

Next, in step 7, the ACP Card Issuer notifies the Identity Protection System that the ACP request has been approved and requests authorization to publish and send the ISO card to the Member/Applicant.

In step 8, the System notifies the Member/Applicant of the approval. The Identity Protection System also gives the Member/Applicant explicit details regarding the identification of the ACP Card mailing container/envelope to assure proper handling upon receipt.

In an alternative embodiment to step 8, the Identity Protection System requests a final authorization by the Member/Applicant to release (i.e. mail) the ISO card, thereby providing an additional confirmation measure.

In step 9, the Identity Protection System receives final applicant authorization and authorizes the ACP Card Issuer to release (i.e. mail) the ACP card to the Member/Applicant.

Once again, the Member's/Applicant's personally identifiable information is retrieved and decrypted from the one or more locations only long enough to allow the ACP Card Issuer to print the mailing envelope containing the Member's/Applicant's ACP card, thereby providing additional protection against theft of identity information from a central data storage location.

In step 10, the Member/Applicant activates his ACP card by calling the Identity Protection System activation telephone number, providing his user name and PIN and describing ACP Card-specific information included to assure Member authentication.

In step 11, a Member making a purchase from an offline Merchant/Retailer submits his ACP card to the cashier (or directly to a credit card scanning device) as any Purchaser would with a conventional debit card. The ACP card is of no value to a criminal or other person in the event the card is stolen or lost. This prevents unauthorized or fraudulent use of the ACP card.

In steps 12-14, the retailer's cashier (or credit card scanning device) processes the transaction authorization request in the same manner as a conventional major credit card. However, unlike a major conventional credit card transaction, the Identity Protection System provides the Member's signature electronically, without identifying the Member's name, thereby preserving complete purchase autonomy as well as total anonymity. The Merchant Processor then routes the authorization request through the appropriate Credit Card Association in the industry standard manner, see step 13. Upon receipt of the transaction approval from the Credit Card Association, the Merchant Processor notifies the Merchant in the industry standard manner. On those rare occasions where some personally identifiable information is demanded by the Merchant/Retailer and the Member is willing to comply with the demand, the Member may manually provide such requested information (i.e. name, telephone number, address, etc.). To provide maximum identity protection, all Members are instructed to comply with identity information requests only when the Merchant/Retailer has a genuine "need-to-know" the requested personally identifiable information. In all embodiments, Members are provided with a live "Purchase Assistance Help Line" (PAHL) to provide point-of-purchase assistance whenever assistance is needed to consummate purchases using the Member's ACP card with maximum purchase anonymity.

In step 15, the Credit Card Association notifies the ACP Card Issuer of the approved transaction concurrent with its notification to the Merchant Processor. Then, in steps 16 and 17, the ACP Card Issuer notifies the Identity Protection System of the approved transaction. The Identity Protection System immediately notifies Members who have chosen to register an email address or text message, thereby providing a real time mechanism by which the Member can track their ACP card purchases and monitor their ACP account balance (step 17).

Step 18 provides a means for Members to dispute previous transactions wherein the ACP card was used. Specifically, a Member, upon notification of an approved transaction by the Identity Protection System, may not agree with the transaction and suspect fraud. In other instances, the Member may discover that his/her ACP card has been lost or stolen. In any of these situations, the Member may request the Identity Protection System to immediately deactivate the ACP card. Alternatively, the Member may simply initiate a dispute against the Merchant/Retailer to whom the transaction was credited (similar to a Merchant dispute involving a conventional credit card).

When a Member initiates a dispute with a Merchant/Retailer, the Identity Protection System routes the dispute to the ACP Card Issuer. The ACP Card Issuer then routes the dispute through the appropriate Credit Card Association for resolution following standard industry protocol procedures used in a conventional credit card transaction dispute. In the unlikely event of a fraudulent transaction attributable to theft of the ACP card, the Member is provided with full (100%) protection by the Identity Protection System against any financial loss or related personal liability. Accordingly, the Identity Protection System uniquely provides its Members with both purchase anonymity and virtually 100% protection against confirmed fraudulent transactions resulting from the theft and misuse of their ACP card.

A further embodiment of the System and method of the present invention provides protection against identity theft when Members of the Identity Protection System use online bill payment and electronic funds transfer services provided by the Member's bank or other financial institution. In this embodiment, the Member instructs the financial institution to route all online bill payments or electronic funds transfers through the Identity Protection System. Subsequently, the Identity Protection System receives all bill payment details, instructions and payment authorization from the Member's financial institution. Much like the previously described embodiment of FIG. 1, directed to online purchase transactions, the Identity Protection System shields the Member's personally identifiable information, including bank account and routing information, from all recipients of online bill payments and electronic funds transfers. All payments made by the Identity Protection System, in the online payment made on behalf of the Member to pay the Member's bills, are made as an untraceable, single-use payment. This untraceable, single-use payment is electronically routed to the appropriate bill payment recipient without revealing unnecessary personally identifiable information of the Member, including routing numbers, bank account numbers and other financial account information.

After the protected single-use payment is routed to the bill payment recipient, the recipient sends an acknowledgment of receipt of the online payment to the Identity Protection System, in the same manner the recipient would do after receiving payment from the Member's financial institution using conventional online bill payment or electronic funds transfer services. Upon receipt of this payment confirmation, the Identity Protection System communicates the consummation of the online payment to the Member's financial institution. The financial institution then debits the bill payment to the Member's statement and reports account status to the Member in the usual manner.

Accordingly, this online bill payment System and method of the present invention removes all traceable identity of the bank (financial institution) routing and account identification information from online bill payment or electronic funds transfer activities. In doing so, the Identity Protection System satisfies the Member's financial obligation without revealing any usable information that could subsequently be employed by payment recipients or third parties to conduct a fraudulent transaction involving the Member's financial account.

In a further embodiment of the invention, the identity theft protection system and method is operable by the user Member on a smart phone. In this particular embodiment, the Member, using his/her smartphone, has a secure multiauthentication login to their Member account. The Member is given the option to access details of their account, make a payment and/or participate in a merchant deal/discount offered at a merchant location. The System uses GPS location detection, via the Member user's smartphone, to verify that the Member is at the merchant location. The system identifies the merchant location, by GPS location detection, when the Member initiates secure access to their account. If the GPS location detection does not work, the Member is asked to provide the identity of the merchant and the merchant location. In order to complete a transaction at the merchant, the Member selects which payment method they have recorded in their account that they wish to use in order to charge/pay for the purchase transaction. If the merchant requests a full card image (i.e., card, expiration, CVV) with anonymous name, the Member requests a one-time use value card from a prompt screen delivered to the Member's smart phone. The system delivers the "card image" to the Member's smart phone with a value that has been requested in order to complete the purchase transaction at the merchant location. In the event the member does not request a card image, a QR code or NFC code is sent to the Member's smart phone. The QR code or NFC code contains the required anonymous purchase information needed to complete the purchase and checkout at the merchant store. This anonymous (virtual) information, includes a one-time use card number that cannot be traced back to the user. No real data belonging to the Member is transmitted or held in the Member's smart phone. At checkout, the Member holds his/her smart phone to the reader at the merchant location, allowing the reader to read the QR code or NFC code. In a further embodiment, a physical card is activated by the smart phone for a one-time charge to check out at the retailer. If the ATM system at the retailer has been compromised, the mag strip information that it compromised is useless to the fraudsters. The amount of the transaction is transmitted back to the System database, checkout is completed and the Member selected payment method is charged in real time. For purposes of tracking and accounting, the Member account, which can be accessed by the Member online, displays the purchase, merchant, date and time of the transaction. In a variation of the process, the Member enters the amount of the transaction on their smart phone and the QR or NFC code subsequently sent to the Member's smart phone contains the exact amount requested by the Member in order to complete the purchase transaction and checkout at the merchant store.

Figure 9:
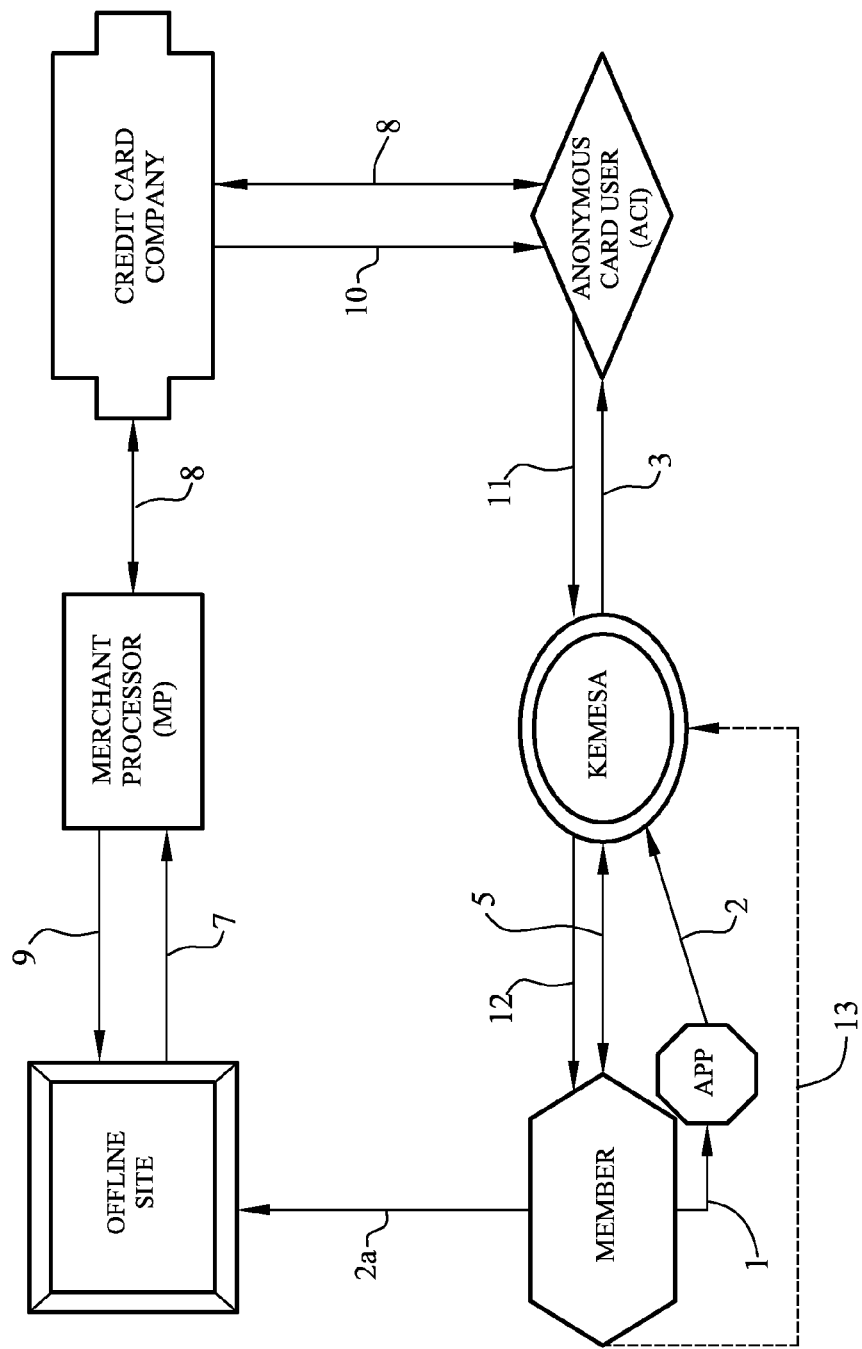
FIG. 9 is a schematic diagram illustrating a sequence of authorization of operation of the personal identity theft protection system and method throughout an offline transaction.

Referring to FIG. 9, identity theft and fraud protection is provided during an offline transaction. Steps 1 and 2 include the Member securely signing into the Identity Protection System to request an ID Card, being either a physical ID Card or a Virtual ID Card for viewing on the Member's smart phone or tablet. At step 3, the System generates the physical ID Card and/or a Virtual ID Card and automatically sends the Virtual ID information to the Member's smart phone or tablet. At step 4, the System notifies the Member that the physical ID card has been physically sent (i.e., mailed) to the Member and/or the Virtual ID card has been electronically sent to the Member. Under step 5, the Member calls or otherwise contacts the System to activate the ID Card and/or download process of the Virtual ID Card to the smart phone or tablet. At step 6, the Member gains access to the site using the physical card (and PIN) or smart phone or tablet (and secure login information). No personal identification information is delivered to the site. Steps 7-9 include the site reading the ID card entry and/or smart phone or tablet entry and routing the authorization request through the established card processing infrastructure to the System for confirmation or denial of the identity of the Member. Steps 10-12 include the System receiving notification that access was approved or denied and the Member account is updated with a time stamp of entry and an electronic message notification (e.g., email, text message, etc.) is delivered to the Member indicating that the Virtual ID Card has been used. Step 13, if necessary, includes the Member notifying the System in the event that use of the Virtual ID Card is disputed.

In a further embodiment, the invention allows the operator of an online website, such as a government website, to authenticate the identity of a Member by accepting all or some anonymous data elements generated by the invention and routing them in the same manner as that of a purchase transaction, thus providing a trusted credential. Together, the anonymous data forms a virtual persona for the Member that is generated by, and can only be approved by, the invention. The invention generates a one-time use card number and billing information for a purchase transaction, and this same billing information is used to authenticate the card to the Member just as is done in a standard credit card transaction.

Figure 10:
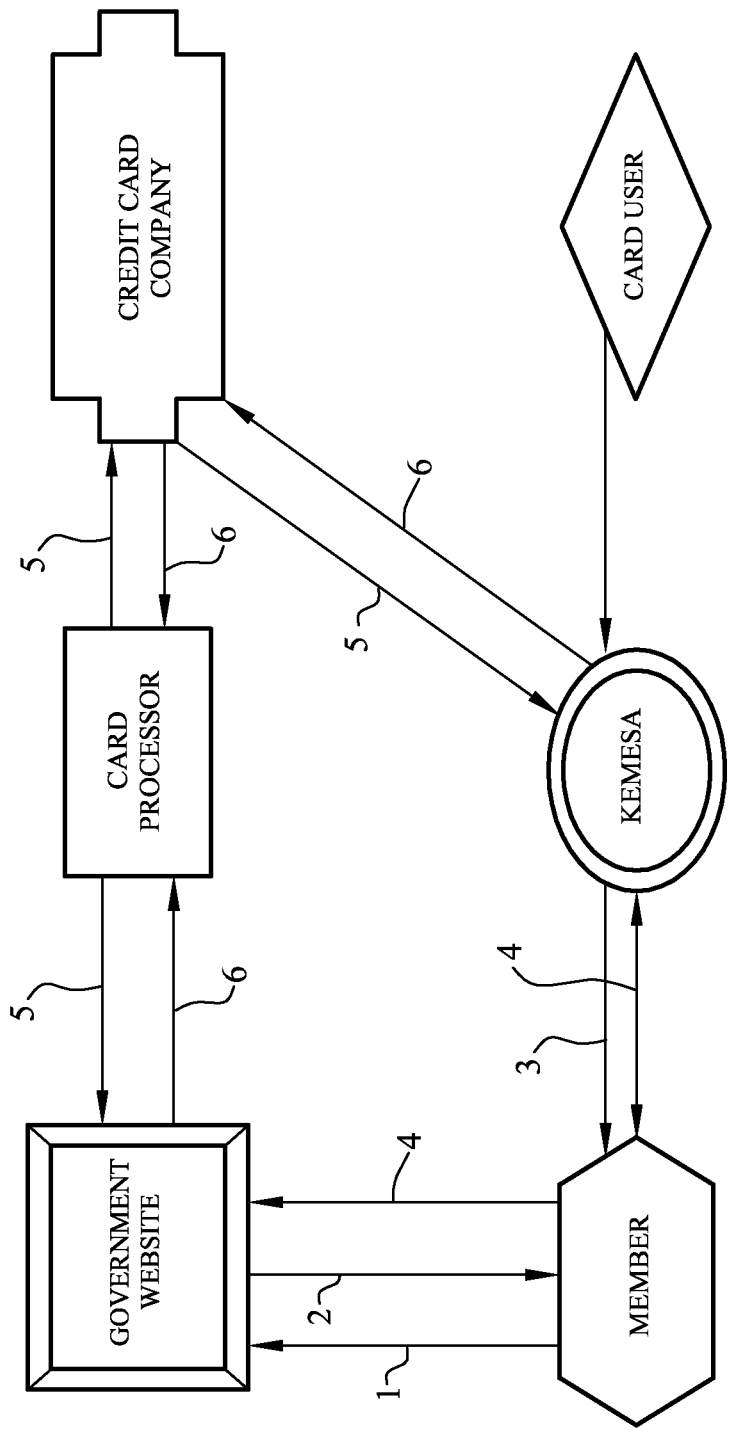
FIG. 10 is a schematic diagram illustrating a sequence of authorization of operation of the personal identity theft protection system and method to anonymously identify a member to an online Merchant or company using trusted credential authorization.

Referring to FIG. 10, step 1 includes the Member logging in on an online website (e.g., a government website) using real personal information as appropriate. At step 2, the online website requests the trusted credential data from the Member, consisting of card and billing information. At step 3, the Member retrieves the trusted credential data from the System. At step 4, the System provides the trusted credential data to the online website. At step 5, the online website submits a request for authorization of the trusted credential data to its card processor, which routes the data to the card company, which subsequently routes the data to the System. At step 6, the System authorizes the request for approval and returns a message through the card company to the online website.

While the present invention has been shown and described in accordance with several preferred and practical embodiments thereof, it is recognized that departures from the instant disclosure are fully contemplated within the spirit and scope of the present invention, which, therefore, is not to be limited except as defined in the following claims as interpreted under the doctrine of equivalents.

What is claimed is:

1. A method for protecting against theft of personally identifiable information during online transactions comprising the steps of:
   establishing, by an identity protection system using a computer, a user as a member of the identity protection system;
   obtaining, by the identity protection system using a computer, personally identifiable information from the member in the form of storable computer data;
   encrypting, by the identity protection system using a computer, the obtained personally identifiable information and storing the personally identifiable information as encrypted data;
   fragmenting, by the identity protection system using a computer, the encrypted data;
   storing portions of the fragmented encrypted data, by the identity protection system using a computer, independently at separate computer storage locations and preventing third party access to the fragmented encrypted data;
   allowing by a computer the member to initiate an online transaction, using a computer device, on a third party website on a global computer network;

receiving, by the identity protection system using a computer, at the time of initiating the online transaction, a request from the member for personally identifiable information of the member for use in conducting the online transaction;

temporarily assembling the stored portions of the fragmented encrypted data and decrypting the encrypted data to obtain the personally identifiable information of the member for the limited time needed to complete the transaction and then subsequently repeating the steps of encrypting, fragmenting and storing portions of the fragmented encrypted data; and generating, by the identity protection system using a computer, virtual personally identifiable information in response to the request when the member is initiating the transaction and providing the virtual personally identifiable information to the third party website, with the use of a computer, without revealing the member's real personally identifiable information.

2. The method as recited in claim 1 wherein the online transaction is a registration transaction.

3. The method as recited in claim 1 further comprising the steps of:

receiving, by the identity protection system using a computer, a request from the third party web site to provide a trusted credential of the member attempting to access the third party website in order to confirm the true identity of the member for authenticated access to the third party website;

comparing, by the identity protection system using a computer, the virtual personally identifiable information provided to the third party website with the member's stored personally identifiable information that has been stored as a member of the identity protection system;

providing, by the identity protection system using a computer, the requested trusted credential of the member to the third party website if the virtual personally identifiable information is successfully matched to the member's stored personally identifiable information by the identity protection system; and denying, by the identity protection system using a computer, the attempted access to the third party website if the virtual personally identifiable information is not successfully matched to the member's stored personally identifiable information by the identity protection system.

4. A method for protecting against theft of personally identifiable information, said method comprising the steps of:

registering, by an identity protection system using a computer, an individual subscriber as a member of the identity protection system and obtaining personally identifiable information from the subscribing member as storable computer data;

encrypting, by the identity protection system using a computer, the obtained personally identifiable information and storing the personally identifiable information as encrypted data;

fragmenting, by the identity protection system using a computer, the encrypted data by a computer;

storing, by the identity protection system, portions of the fragmented encrypted data, by at least one computer, independently at separate computer storage locations;

preventing, by the identity protection system using a computer, third party access to the fragmented encrypted data;

detecting, by the identity protection system using a computer, that the subscribing member is attempting to send an email to a recipient from the subscribing member's real email address;

automatically generating, by the identity protection system using a computer, an anonymous email address on behalf of the subscribing member in response to the subscribing member attempting to send an email to the recipient from the subscribing member's real email address;

allowing, by the identity protection system using a computer, the subscribing member to send the email communication to the recipient from the subscribing member's real email address and directing the subscribing member's email communication to the anonymous email address;

forwarding, by the identity protection system using a computer, the subscribing member's email communication to the recipient from the subscribing member's anonymous email address without ever revealing the subscribing member's real email address to the recipient;

receiving, by the identity protection system using a computer, an email communication from the recipient at the anonymous email address;

storing, by the identity protection system using a computer, the routing information from the received email communication;

scrubbing, by the identity protection system using a computer, the received email communication for electronic viruses; and forwarding, by the identity protection system using a computer, the received email communication from the anonymous email address to the subscribing member's real email address.

5. The method as recited in claim 4 further comprising the step of:

alerting, by the identity protection system using a computer, the subscribing member when an email communication having unidentified routing information is received at the anonymous email address.

6. The method as recited in claim 4 wherein the email recipient is a business entity.

7. A method for protecting against theft of personally identifiable information during online transactions comprising the steps of:

establishing, by an identity protection system using a computer, a user as a member of the identity protection system;

obtaining, by the identity protection system using a computer, personally identifiable information from the member in the form of storable computer data;

encrypting, by the identity protection system using a computer, the obtained personally identifiable information and storing the personally identifiable information as encrypted data;

fragmenting, by the identity protection system using a computer, the encrypted data;

storing portions of the fragmented encrypted data, by the identity protection system using a computer, independently at separate computer storage locations and preventing third party access to the fragmented encrypted data;

assigning codes to the stored portions of the fragmented encrypted data;

allowing by a computer the member to initiate an online transaction, using a computer device, on a third party website on a global computer network;

receiving, by the identity protection system using a computer, at the time of initiating the online transaction, a request from the member for virtual identity information for use in conducting the online transaction;

matching the codes of the stored portions of the fragmented encrypted data for purposes of retrieving and assembling the stored portions of the fragmented encrypted data;

temporarily assembling the stored portions of the fragmented encrypted data and decrypting the encrypted data to obtain the personally identifiable information of the member for the limited time needed to complete the transaction and then subsequently repeating the steps of encrypting, fragmenting and storing portions of the fragmented encrypted data; and generating, by the identity protection system using a computer, virtual identity information in response to the request when the member is initiating the transaction, matching the generated virtual identity information with the temporarily assembled stored portions of the fragmented encrypted data, and providing the generated virtual identity information to the third party web site, with the use of a computer, without revealing the member's real personally identifiable information.

\* \* \* \* \*